US007916593B2

(12) United States Patent
Tanaka et al.

(10) Patent No.: US 7,916,593 B2
(45) Date of Patent: Mar. 29, 2011

(54) OPTICAL DISK DEVICE AND METHOD OF CONTROL OF AN OPTICAL DISK UTILIZING RETRY FEATURE

(75) Inventors: Norio Tanaka, Kanagawa (JP); Takashi Nagatomo, Kanagawa (JP); Akio Terada, Kanagawa (JP); Yuichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 685 days.

(21) Appl. No.: 11/064,222

(22) Filed: Feb. 23, 2005

(65) Prior Publication Data
US 2005/0213446 A1 Sep. 29, 2005

(30) Foreign Application Priority Data

Feb. 24, 2004 (JP) ................. 2004-048829

(51) Int. Cl.
*G11B 20/18* (2006.01)
(52) U.S. Cl. ................. 369/53.15; 369/53.18
(58) Field of Classification Search ............... 369/30.21, 369/30.22, 44.32, 44.33, 47.14, 47.4, 47.45, 369/53.15, 53.17, 53.35, 100, 275.1, 275.2, 369/275.3, 275.4, 53.14, 53.16, 53.18, 53.19, 369/53.29, 30.1, 30.11
See application file for complete search history.

(56) References Cited

U.S. PATENT DOCUMENTS

| 4,498,146 | A | * | 2/1985 | Martinez ................. 711/115 |
| 4,674,078 | A | * | 6/1987 | Otsuka et al. ............ 369/44.25 |
| 5,136,560 | A | * | 8/1992 | Hangai et al. ............ 369/30.17 |
| 5,202,876 | A | * | 4/1993 | Takagi et al. ............ 369/53.17 |
| 5,235,585 | A | * | 8/1993 | Bish et al. ................. 369/53.17 |
| 5,303,219 | A | * | 4/1994 | Kulakowski et al. ...... 369/53.17 |
| 5,418,767 | A | * | 5/1995 | Gaudet et al. ............. 369/53.16 |
| 5,526,335 | A | * | 6/1996 | Tamegai ................... 369/53.16 |
| 5,528,574 | A | * | 6/1996 | Takeuchi et al. ............. 369/47.4 |
| 5,757,750 | A | * | 5/1998 | Uemura ................... 369/47.41 |
| 5,761,301 | A | * | 6/1998 | Oshima et al. ................ 705/57 |
| 5,844,911 | A | * | 12/1998 | Schadegg et al. ............ 714/710 |
| 5,883,866 | A | * | 3/1999 | Shimizume et al. ....... 369/47.41 |
| 6,034,831 | A | * | 3/2000 | Dobbek et al. ............... 360/53 |
| 6,043,945 | A | | 3/2000 | Tsuboi et al. |
| 6,169,710 | B1 | * | 1/2001 | Arai ...................... 369/30.11 |
| 6,195,325 | B1 | * | 2/2001 | Okanishi ................. 369/124.08 |
| 6,310,838 | B1 | * | 10/2001 | Heemskerk et al. ........ 369/30.1 |
| 6,332,204 | B1 | * | 12/2001 | Russell ..................... 714/710 |
| 6,414,921 | B1 | * | 7/2002 | Kim ....................... 369/47.44 |
| 6,625,096 | B1 | * | 9/2003 | Arai ....................... 369/47.34 |
| 6,631,105 | B1 | | 10/2003 | Fukuda et al. |
| 6,654,193 | B1 | * | 11/2003 | Thelin ....................... 360/53 |
| 2002/0083779 | A1 | * | 7/2002 | Narita et al. ............ 73/862.191 |
| 2002/0141208 | A1 | | 10/2002 | Nanbu et al. |
| 2003/0031106 | A1 | * | 2/2003 | Ozaki ..................... 369/53.17 |

FOREIGN PATENT DOCUMENTS

EP    0 523 985    1/1993

(Continued)

*Primary Examiner* — Hoa Nguyen
*Assistant Examiner* — Mark L Fischer
(74) *Attorney, Agent, or Firm* — Frommer Lawrence & Haug LLP; William S. Frommer; Thomas F. Presson

(57) ABSTRACT

An optical disk device capable of increasing access speed and an image pickup device having such an optical disk device. In a region at the inside of an optical disk where the rotational speed of the spindle motor reaches its limit, a CAV mode is used for access, while in a region at the outside of the optical disk where a frequency band of an RF signal processor reaches its limit, a CLV mode is used for access. High-speed access to a maximum extent in a range of performance limits of the spindle motor and the RF signal processor is achieved. A retry feature retries failed access attempts to the optical disk when access failure is determined and a controller judges whether or not a defect of the optical disk has caused the access failure. The controller further judges if the predetermined cause of the access failure repeatedly occurs in a predetermined nearby range on the optical disk.

17 Claims, 13 Drawing Sheets

FOREIGN PATENT DOCUMENTS

| | | |
|---|---|---|
| EP | 0 825 601 | 2/1998 |
| JP | 3 84736 | 4/1991 |
| JP | 7 98878 | 4/1995 |
| JP | 8 185663 | 7/1996 |
| JP | 9 44980 | 2/1997 |
| JP | 9 306092 | 11/1997 |
| JP | 9 320170 | 12/1997 |
| JP | 10 27421 | 1/1998 |
| JP | 10 55609 | 2/1998 |
| JP | 10 92102 | 4/1998 |
| JP | 2000 260032 | 9/2000 |
| JP | 2000 331344 | 11/2000 |
| JP | 2001 143373 | 5/2001 |
| JP | 2001143373 A * | 5/2001 |

* cited by examiner

OPTICAL DISK DEVICE AND METHOD OF CONTROL OF AN OPTICAL DISK UTILIZING RETRY FEATURE

BACKGROUND

1. Field of the Invention

The present invention relates generally to an optical disk device and method of controlling an optical disk device for rotating the optical disk.

2. Background Discussion

In the past, for large capacity data recording applications, a magnetic tape, an opto-magnetic tape, and other tape-like recording media have mainly been used, but in recent years Digital Versatile Disks (DVDs) and other similar optical disks are used, which can handle a large amount of data. Therefore, optical disks, such as DVDs are increasingly being used for recording applications.

In an optical disk, there is no rewind or feed operation such as with a tape-like recording medium and the target address can be accessed at a high speed. Therefore, at a time of random access, the optical disk can access data at a higher speed than a tape-like recording medium.

However, in image pickup devices and other image data processing devices, the amount of data processed has been increasing, so optical disk devices have been required to record and reproduce large amounts of data at high speeds.

SUMMARY OF THE INVENTION

The present invention relates to an optical disk device and method of controlling an optical disk that enables a higher access speed.

One embodiment of the present invention is directed to an optical disk device comprising a rotational drive portion for driving a rotation of the optical disk and a controller for controlling the rotational drive portion so as to drive the rotation of the optical disk by a constant angular speed when accessing a region from a center of the optical disk to a first track between the center and an outer periphery of the optical disk and so as to drive rotation of the optical disk by a constant linear speed when accessing a region from the first track to the track at an outer periphery of the optical disk.

Preferably, the first track is determined by a rotational performance of the optical disk, the rotational drive portion and a data read speed.

The controller retries failed access attempts to the optical disk when access failure is determined and the controller judges whether or not a defect of the optical disk has caused the access failure and the controller further judges if the predetermined cause of the access failure repeatedly occurs in a predetermined nearby range on the optical disk.

The device of the first aspect of the invention may further comprise a vibration detector for detecting a vibration occurring in the optical disk, and the controller judges whether or not a vibration caused the access failure when, in the retry of the access attempts, the cause of the access failure does not repeatedly occur in the predetermined nearby range, the vibration detected by the vibration detector exceeds a predetermined threshold value at a time of the access failure and the controller judges whether or not the defect of the optical disk caused the access failure when the vibration does not exceed the predetermined threshold value.

Further, the controller may judge that the defect of the optical disk has caused access failure when accessing a designated address on the optical disk, the controller changes an access destination to an address away from the address that caused a failed access attempt, by exactly a width of a first address, if information relating to the address is read from the optical disk, while the controller determines if access is possible at a predetermined reference position of the optical disk and if information relating to the address is read and, if access is possible at the reference position, then the controller changes the access destination to an address away from the address that caused a failed access attempt, by exactly a second address width longer than the first address width.

Another embodiment of the present invention is directed to an optical disk device wherein (i) a rotational speed of the optical disk becomes constant when a position of an emitted beam is in the region from the center of the optical disk to the first track, and (ii) the position of the emitted beam moves on an information track by a constant speed when the position of the emitted beam is from the first track to an outer peripheral edge of the optical disk.

This device may further have an optical pickup for outputting the emitted beam reflected from the optical disk and converted to an electrical signal; and a signal processor for processing an output signal of the optical pickup, wherein, (i) when the rotational speed of the optical disk is constant, the rotational speed becomes a rotational speed of a predetermined upper limit capable of being driven by the rotational drive and (ii) a speed of movement of the position of the emitted beam on the information track controls the rotational drive portion so that a frequency of the output signal of the optical pickup becomes a frequency of a predetermined upper limit capable of being processed at the signal processor.

Yet another embodiment of the present invention is directed to a method of controlling of an optical disk by driving the rotation of the optical disk at a constant angular speed when accessing a region from a center of the optical disk to a first track between the center of the optical disk and an outer periphery of the optical disk; and driving the rotation of the optical disk at a constant linear speed when accessing a region from the first track to an outer peripheral edge of the optical disk.

Yet another embodiment of the present invention is directed to an optical disk device comprising; a controller for judging that a defect of the optical disk has caused an access failure when a predetermined cause of access failure repeatedly occurs in a predetermined nearby range on the optical disk.

Yet another embodiment of the present invention is directed to an optical disk device for judging that a defect of the optical disk has caused access failure when accessing a designated address on the optical disk, the controller changes an access destination to an address away from the address that caused a failed access attempt, by exactly a width of a first address, if information relating to the address is read from the optical disk, while the controller determines if access is possible at a predetermined reference position of the optical disk and if information relating to the address is read and, if access is possible at the reference position, then the controller changes the access destination to an address away from the address that caused a failed access attempt, by exactly a second address width longer than the first address width.

If information relating to the address is not read, before determining said predetermined reference position, said controller searches for a readable address in a predetermined range of addresses from said address that was not accessed and, if said range has a readable address, the controller changes the access destination to said address, while if said range does not have a readable address, the controller determines said reference position.

The controller may perform processing for retrying failed access attempts when judging in a retry of said access attempts that a defect of said optical disk has caused the access failure if a predetermined cause of access failure repeatedly occurs in a predetermined nearby range on said optical disk, and said controller executes access destination changing processing when the judgment is repeated over a predetermined time or a predetermined number of times.

Yet another embodiment of the present invention is directed to a vibration detector for detecting a vibration occurring in the optical disk, wherein the controller judges whether or not a vibration caused the access failure when, in the a retry of the access attempts, the cause of the access failure does not repeatedly occur in the predetermined nearby range, the vibration detected by the vibration detector exceeds a predetermined threshold value at a time of the access failure and the controller judges whether or not a defect of the optical disk caused the access failure when the vibration does not exceed the predetermined threshold value.

Thus, according to the present invention, first, by suitably switching the mode of the rotational control of the optical disk between the mode of a constant rotational speed and the mode of a constant linear velocity, the restrictions on the linear velocity due to the limits of performance of the rotational drive disappear and the access speed can be increased.

Second, failure of access occurring due to a defect of the optical disk and failure of access occurring due to vibration from an external source can be distinguished.

Third, when failing in access due to a defect of the optical disk, by changing the access destination to an address a suitable address width away in accordance with the state of the defect, the delay in processing due to the failure in access can be suppressed.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Six exemplary embodiments of the present invention will be explained with reference to the drawings.

First Embodiment

Video devices comprising video players or video cameras using optical disks are becoming more and more popular. In recent years, optical disks have been made smaller in size and larger in storage capacity. As a result, the performance of optical disks has improved significantly.

The drive system of the optical disk is used to drive the optical disk and includes the CLV (constant linear velocity) system for driving the optical disk at a constant linear velocity and the CAV (constant angular velocity) system for driving the optical disk at a constant angular velocity.

When using an optical disk for a small sized video device such as a video camera, there are restrictions in the rotational performance of the spindle motor driving the optical disk. Due to this restriction, for example, even if an optical disk is formatted to be driven by a constant linear velocity on a recording medium of the video camera, due to the limits of performance of the small sized spindle motor, many of the regions of the optical disk may not be used at a desired linear velocity.

Figure 11:
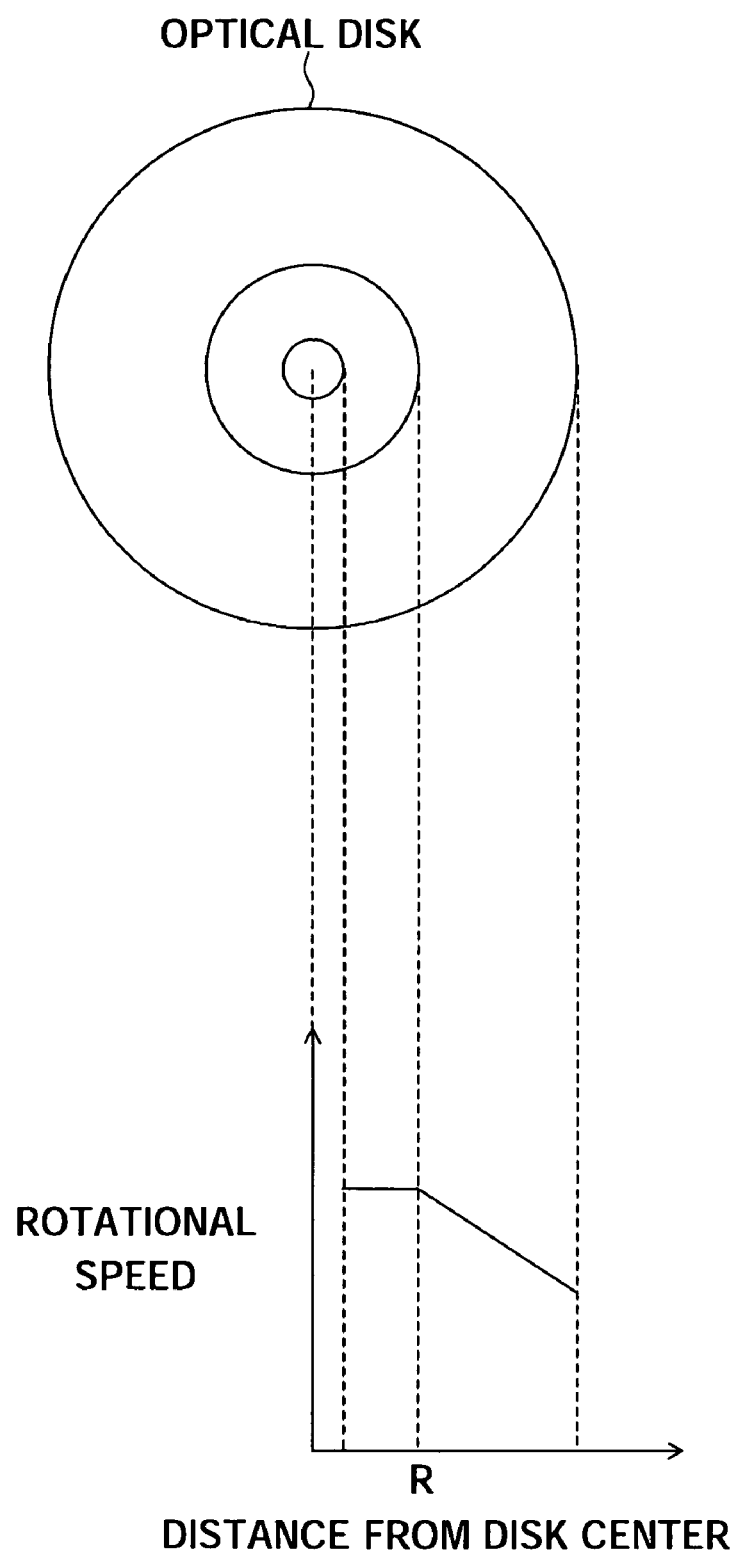
FIG. 11 is an example of the relationship between the emitted position of the laser beam from the center of the optical disk and the rotational speed of the optical disk in an optical disk device.

Therefore, as shown in FIG. 11, for example, it is part of the present invention to drive CLV formatted optical disks from the center of an optical disk to a certain track by the CAV system and drive the optical disk from a region starting at the certain track to a peripheral edge of the optical disk by the CLV system, thus changing the rotational speed of the spindle motor in accordance with the position of a laser beam on the track.

This drive system is called a limited CLV (LCLV) system.

Note that video cameras and other video devices may carry various types of replaceable optical disks. In the optical disk device according to an embodiment of the present invention, it is also possible to drive the optical disk not only by the LCLV system, but also by either the CLV system or the CAV system.

Second Embodiment

Figure 1:
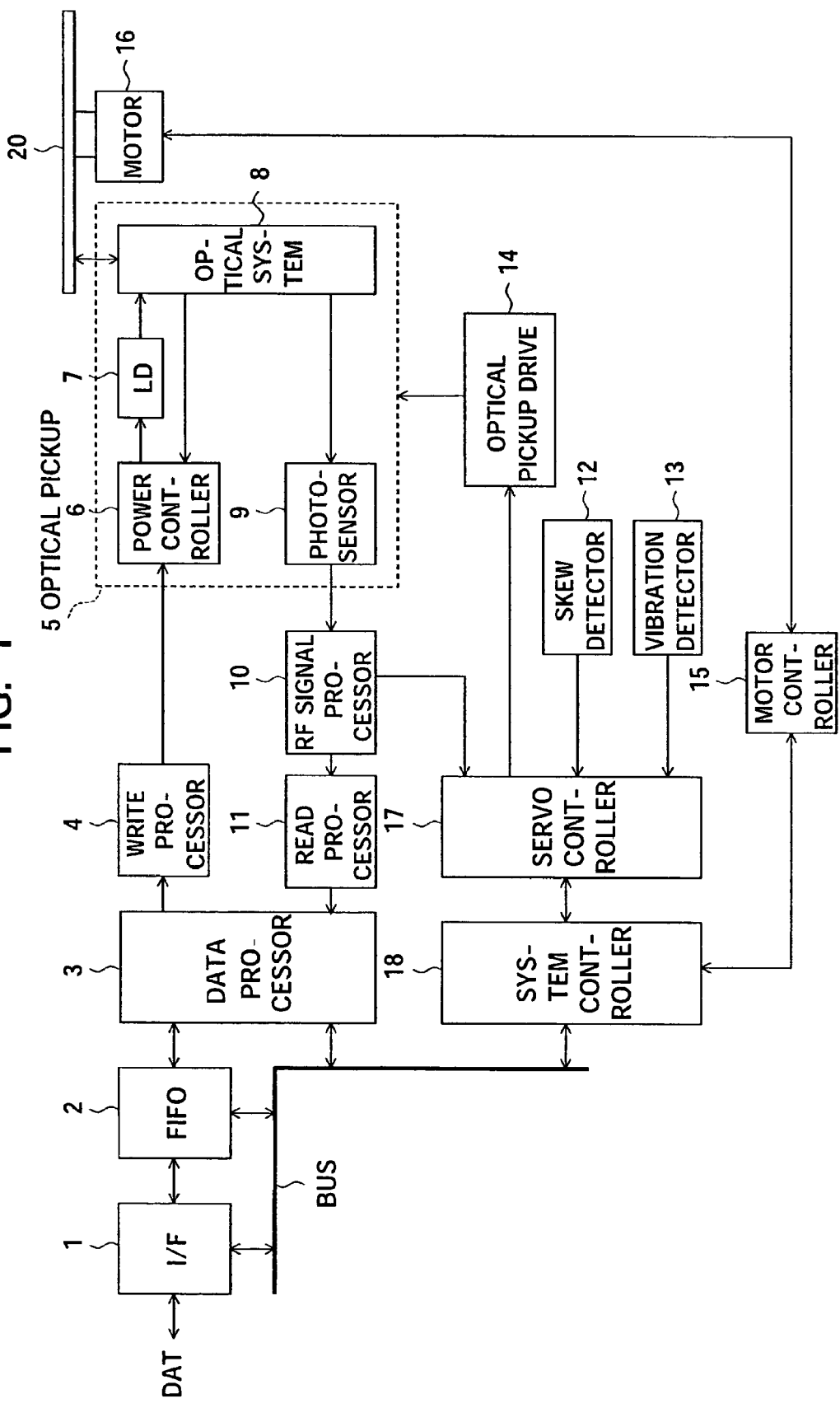
FIG. 1 is an example of a configuration of an optical disk device according to an embodiment of the present invention.

FIG. 1 is an example of a configuration of an optical disk device according to a first embodiment of the present invention.

The optical disk device shown in FIG. 1 has an interface 1, a FIFO unit 2, a data processor 3, a write processor 4, an optical pickup 5, an RF signal processor 10, a read processor 11, a skew detector 12, a vibration detector 13, an optical pickup drive 14, a motor controller 15, a spindle motor 16, a servo controller 17, and a system controller 18.

Further, the optical pickup 5 has a power controller 6, a laser diode 7, an optical system 8, and a photosensor 9.

In the above configuration, the motor 16 is an illustration of the rotational drive of the present invention.

The system controller 18 is an illustration of the controller of the present invention.

The vibration detector 13 is an illustration of a vibration detector of the present invention.

The optical pickup 5 is an illustration of the optical pickup of the present invention.

The optical pickup drive 14 is an illustration of the optical pickup drive of the present invention.

The unit including the RF signal processor 10 and the read processor 11 is an illustration of a signal processor of the present invention.

The motor controller 15 is an illustration of a rotation controller of the present invention.

The skew detector 12 is an illustration of a skew detector of the present invention.

The above-mentioned components of the optical disk device shown in FIG. 1 are explained.

Interface 1 inputs write data to the optical disk 20 from an external device (not shown). Further, interface 1 outputs read data from the optical disk 20 to an external device (not shown). Further, the optical disk device performs processing for transferring various instructions input from the external device to the system controller 18 or processing for transferring response messages emitted from the system controller 18 to the external device.

Interface 1 interfaces with such an external device in accordance with, for example, the ATA (AT Attachment) or other general use interface standard.

The FIFO unit 2 temporarily stores the write data input from interface 1 to the data processor 3 and the read data read from the data processor 3 to interface 1.

The data processor 3 performs various data processing on the write data and read data of the optical disk 20.

The write data input by interface 1 is subjected to predetermined code processing (e.g., error correction code processing) in accordance with a predetermined recording format of the optical disk 20. Due to this, the write data is replaced with data of a format written to the optical disk 20. Further, the read data input from the read processor 11 is subjected to decoding processing As a result, the data before writing is reproduced.

The write processor 4 generates a write pulse signal used for driving the laser diode 7 based on the write data processed by the data processor 3. The write processor 4 suitably sets the amplitude or pulse width of the write pulse signal in accordance with the type of the optical disk 20 to be written on.

The power controller 6 detects the output power of the laser diode 7 fed back from the optical system 8 and controls the amount of emission of the laser diode 7 so that the detected power and the detected output power in the write pulse signal become equal.

The laser diode 7 generates a laser beam having power in accordance with the control of the power controller 6.

The optical system 8 guides the laser beam generated at the laser diode 7 and focuses it on the light-receiving surface of the optical disk 20. Further, part of the laser beam generated at the laser diode 7 is returned to the power controller 6. The light reflected from the optical disk 20 is guided to the photosensor 9.

The focal position of the optical system 8 with respect to the optical disk 20 changes in accordance with how the optical pickup drive 14 is driven.

The photosensor 9 converts light reflected from the optical disk 20 to an electrical signal.

The photosensor 9 is designed so that in addition to the information recorded on the optical disk 20, information showing a deviation between an information track of the optical disk 20 and a position of the emitted laser beam (tracking error) and information showing the deviation of the focus of the optical system 8 to the optical disk 20 (focus error) are obtained.

For example, the photosensor 9 has a plurality of optical detectors arranged so as to be able to detect the strength of the reflected light at a plurality of symmetric positions on a plane, which the beam reflected from the optical disk 20 strikes.

The RF signal processor 10 amplifies, binarizes, or otherwise processes by an RF mechanism the electrical signal converted by the photosensor 9 to generate read data in accordance with the recorded data of the optical disk 20.

Further, the RF signal processor 10 generates a signal relating to the above-mentioned tracking error or focus error in accordance with an output signal of the photosensor 9 and outputs such signal to the servo controller 17. For example, the RF signal processor 10 performs processing to, for instance, add to or subtract from. The results of detection of the above-mentioned plurality of optical detectors are included in the photosensor 9 to generate a signal relating to tracking error or focus error. These signals are used in the servo controller 17 for servo control.

Further, in the present embodiment, as one example, it is assumed that wobble is formed on the information tracks of the optical disk 20. The term "wobble" refers to a periodic serpentine shape provided at a side face of the information track. For example, information of the clock signal serving as a reference at a time of access for a write operation or information on an address on the information track, is buried in the optical disk 20 as wobble.

The RF signal processor 10 extracts a periodic signal component based on this wobble (wobble signal) from the output signal of the photosensor 9 and outputs such signal to the read processor 11.

The read processor 11 performs various processing on the signal read from the optical disk 20. For example, the read processor 11 performs processing for reproducing a reference clock signal based on the wobble signal output from the RF signal processor 10 and processing for demodulating the wobble signal and reproducing the address information on the information track.

The skew detector 12 detects the skew of the light-receiving surface of the optical disk 20 with respect to the beam emitted from the optical pickup 5. The skew of the optical disk 20 occurs, for example, due to a shaking of an outer circumference of the optical disk 26 that is due to a shock applied in a direction parallel to the axis of rotation of the optical disk 20.

The vibration detector 13 detects vibration applied to the optical disk device. For detection of vibration an acceleration sensor may be used.

The optical pickup drive 14, under the control of the servo controller 17, makes the position of the emitted laser beam of the optical pickup with respect to the information track or the focus position of the optical system 8 move. For example, the optical pickup drive 14 has an actuator, which makes the optical pickup 5 slide in a direction along the plane of the optical disk 20 or in a direction vertical to the plane.

The motor controller 15 controls the spindle motor 16 so that the rotational speed of the optical disk 20 is held at the rotational speed designated by the system controller 18.

The spindle motor 16 drives the rotation of the optical disk 20 under the control of the motor controller 15.

The servo controller 17 controls the optical pickup drive 14 by servo control in accordance with a signal of the tracking error or focus error produced by the RF signal processor 10 so that the laser beam of the optical pickup 5 is emitted at a designated position on the information track of the optical disk 20 in the state of focus of the optical system 8.

Further, the servo controller 17 controls the optical pickup drive 14 in accordance with the results of detection of the skew detector 12 or vibration detector 13 so that even when an external shock causes vibration, the above-mentioned servo control works. When a collision between the optical pickup 5 and optical disk 20 is imminent, the servo controller 17 controls the optical pickup drive 14 so that the collision is avoided.

Further, the servo controller 17 notifies the system controller 18 when a lock has been lost on the servo control for emitting the laser beam at a designated position on the information track (tracking control) or servo control for focusing the optical system 8 on the information track (focus control).

The system controller 18 performs various processing related to the overall operation of the optical disk device.

For example, the system controller 18 acquires instructions from external devices input through interface 1, sends messages to the external devices, monitors the amount of write data or read data stored in the FIFO unit 2, acquires address information of the optical disk 20 reproduced at the read processor 11, instructs processing at the data processor 3 or servo controller 17.

Further, the system controller 18 performs processing for retrying failed access attempts when attempting to access the optical disk 20. Further, when re-attempting an access, if poor servo control, poor reading of address information, or any other cause of access failure repeatedly occurs in a predetermined nearby range on the optical disk 20, the system controller 18 performs processing in order to judge whether or not access has failed due to defects of the optical disk 20.

Further, when a judgment is made that access to the designated address on the optical disk 20 has failed due to a defect of the optical disk 20, the system controller 18 performs processing for updating the access destination to an address away from the failed address to be accessed by a predetermined address width (first address width) if the read processor 11 can read the address information. On the other hand, if the read processor 11 does not read the address information (for example, when a lock on the tracking control or focus control by the servo controller 18 is lost), the system controller 18 determines if access is possible at a predetermined reference position of the optical disk 20 (for example, an innermost circumference of optical disk 20) and updates the access destination to an address away from the failed address to be accessed by a predetermined address width (second address width longer than first address width) if access at this reference position is possible.

The operation in the case where the optical disk device shown in FIG. 1 has the above configuration and executes read access or write access processing (hereinafter referred to as an "R/W access") is explained.

Figure 2:
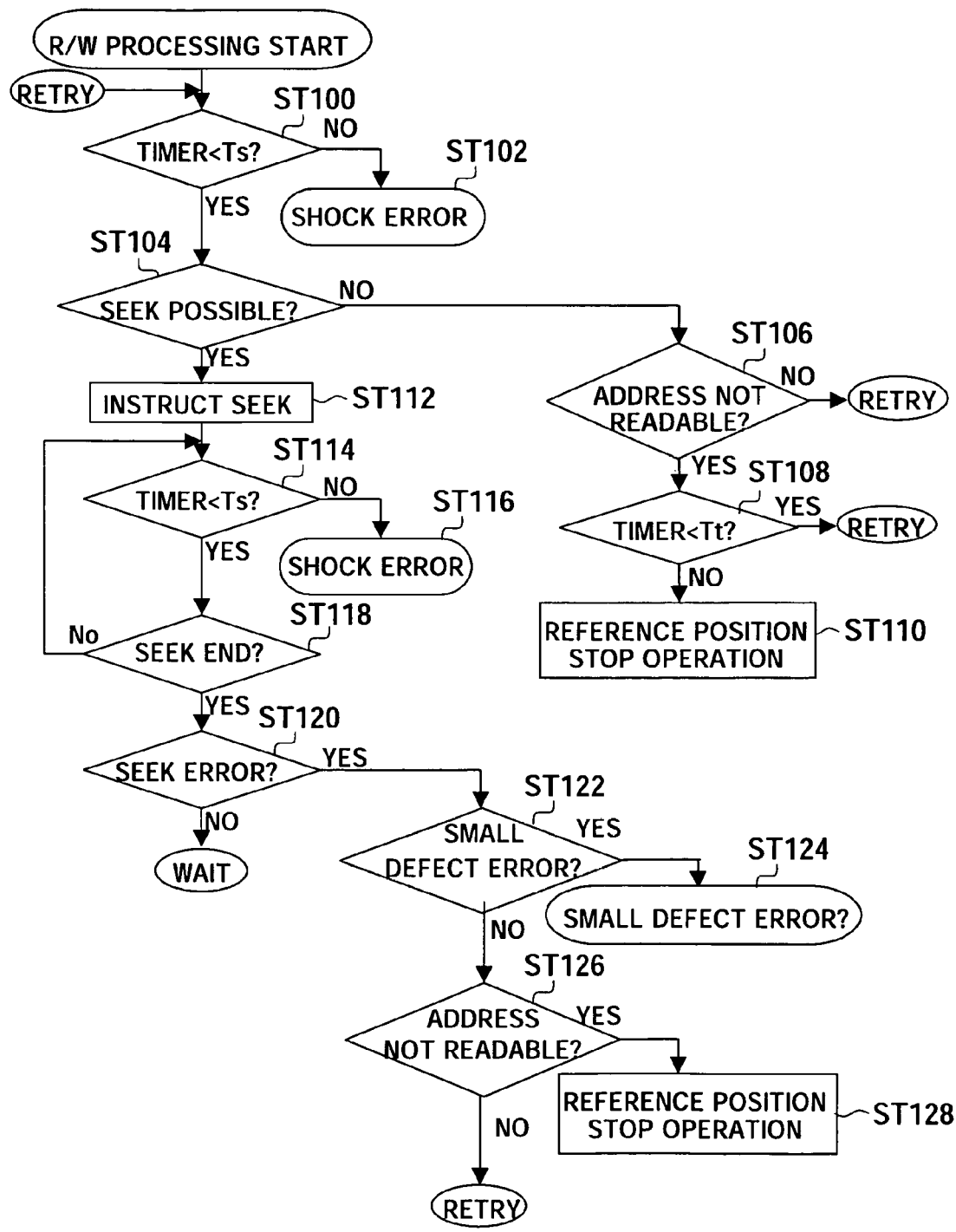
FIG. 2 is a first flow chart showing the processing in write access or read access processing.
Figure 3:
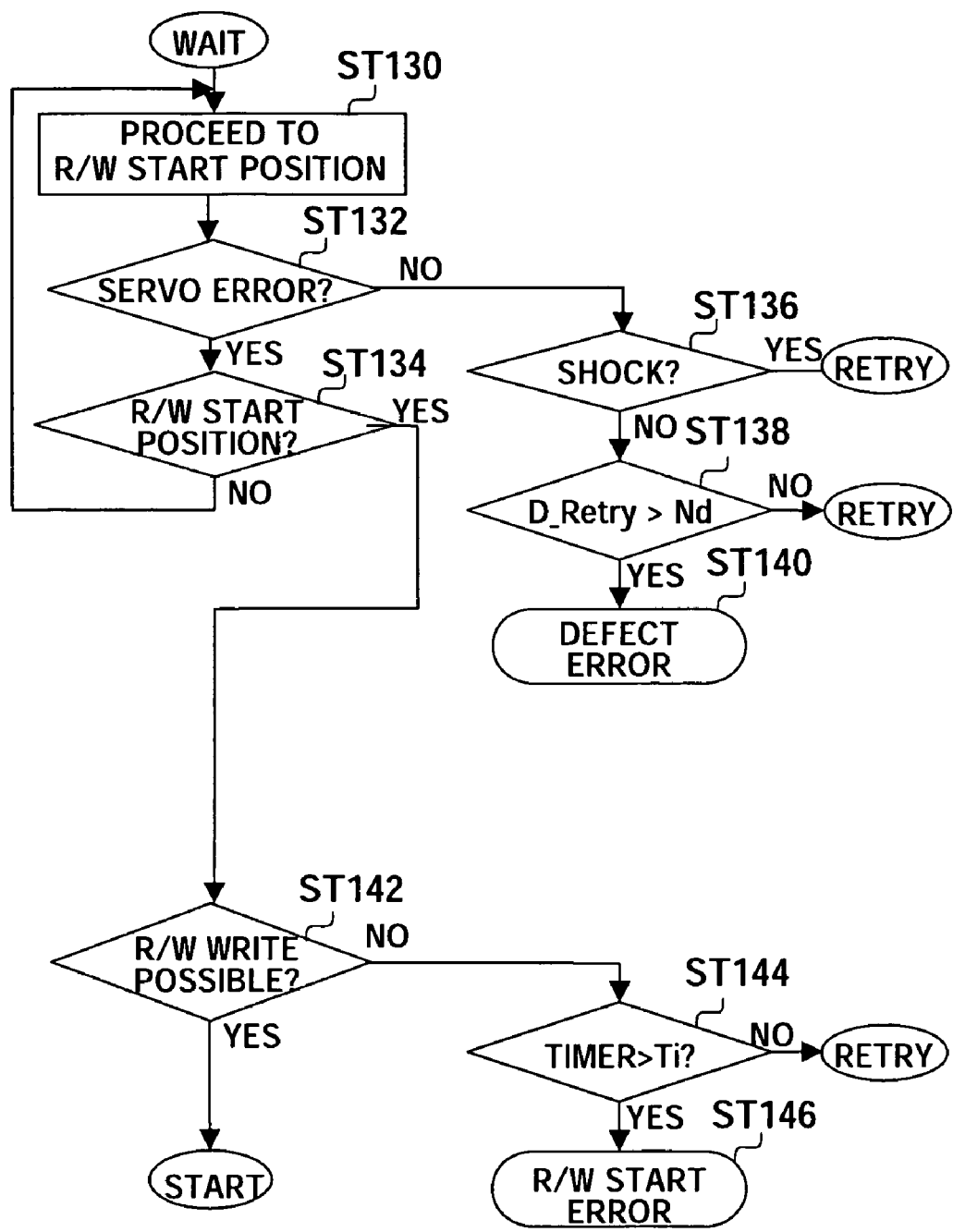
FIG. 3 is a second flow chart showing the processing in write access or read access processing.
Figure 4:
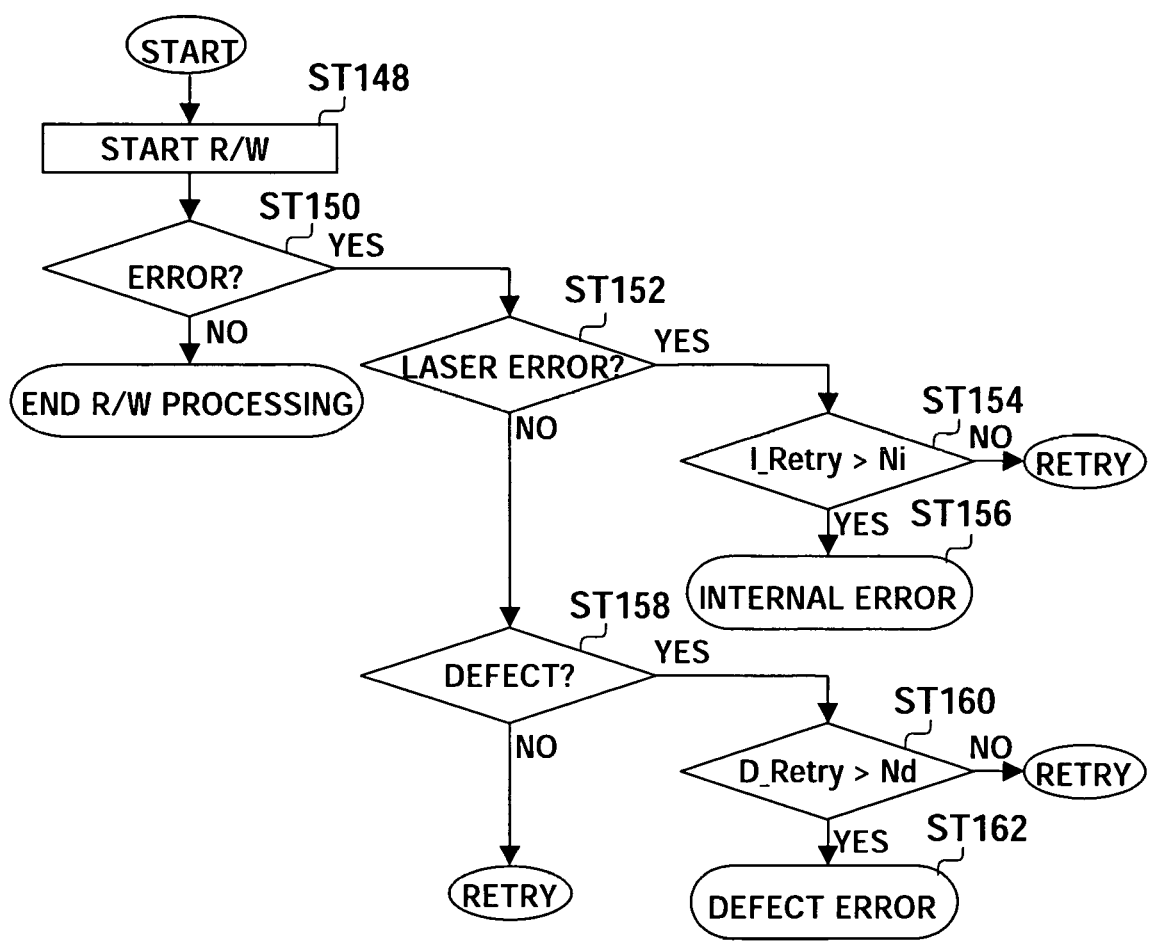
FIG. 4 is a third flow chart showing the processing in write access or read access processing.

FIG. 2 to FIG. 4 are flow charts illustrating an example of R/W access processing.

In executing an R/W access, the system controller sets the following constants.

Constant #1: (External Factor Timeout Time Ts)

The external factor timeout time Ts shows an upper limit of the time during which a retry of access is repeated when a vibration or other external factor causes access failure. However, a starting point of the upper limit time is a time when an external device issues an instruction to the system controller 18 instructing execution of a write or read access.

Constant #2: (Upper Limit Value of Number of Retries Nd at Time of Defect)

The upper limit value of the number of retries Nd at the time of a defect indicates an upper limit value of the number of retries when retrying access due to a defect of the optical disk 20.

Constant #3: (Upper Limit Value of Number of Retries Ni at Time of Internal Error)

The upper limit value of the number of retries Ni at the time of internal error indicates an upper limit value of the number of retries when retrying access due to an internal error of the optical disk device.

Constant #4: (Timeout Time Before Seek Start Tt)

This shows the upper limit of the time during which a retry of access is repeated before starting the seek processing. The starting point of the upper limit time is the same as the external factor timeout time Ts.

Constant #5: (Internal Factor Timeout Time Ti)

This constant shows the upper limit of the time during which a retry is possible when an internal cause of the optical disk device causes access failure. The starting point of the upper limit time is the same as the external factor timeout time Ts.

The above-mentioned five constants are, for example, given from an external device through interface 1 to the system controller 18.

When the external device issues an instruction for R/W access, the system controller 18 starts the count at the internal timer from the time of issuance of the instruction.

First, the system controller 18 compares this timer value and the external factor timeout time Ts (step ST100) and, when the timer value exceeds this upper limit, the system controller 18 ends the access retries and executes predetermined error processing (step ST102). For example, the system controller 18 performs processing to notify the external device that an error has occurred due to a shock or other external factor.

When the timer value is not over the external factor timeout time Ts, the system controller 18 determines if a seek operation is possible (step ST104).

When a seek operation is not possible, the system controller 18 determines if the cause is poor reading of the address (step ST106). For example, the system controller 18 determines if address information can no longer be read due to a complete loss of lock of the tracking control or focus control in the servo controller 17. If no such error occurs and the address can be read from the optical disk 20, the routine returns to step ST100 and the R/W access processing is executed again.

On the other hand, when the address information is not read, the system controller 18 compares the above-mentioned timer value and the timeout time before seek start Tt (step ST108). When the timer value exceeds this upper limit, the routine returns to step ST100 where the R/W access processing is executed again. When the timer value exceeds this upper limit value, the controller determines if access is possible at the reference position of the optical disk 20 in the reference position stopping operation ST110. The reference position stopping operation ST110 is explained in detail with reference to FIG. 5 and FIG. 6.

When judging at step ST104 that a seek operation is possible, the system controller 18 starts the seek operation (step ST112). In the seek operation, the system controller 18 moves the position of the emitted laser beam in the radial direction of the optical disk 20 while skipping the information track so as to jump the accessed address to one track before the track containing the target address of the start of R/W process (one circumference of the information track).

Until the seek operation ends, the system controller 18 monitors if the above-mentioned timer value exceeds the external factor timeout time Ts (step ST114, ST118). If, for instance, shock causes the seek operation not to end and the timer value exceeds the external factor timeout time Ts, the system controller 18 ends the access retries and executes the same error processing as in step ST102 (step ST116).

When the seek operation ends, the system controller 18 judges if it has failed in the seek operation (step ST120).

When failing in the seek operation, the system controller 18 judges if this failure was due to a small defect error (step ST122). Here, "small defect error" refers to access errors arising due to defects of a relatively small range of an optical disk 20. The case when loss of lock of focus control or tracking control in the servo controller 17 results in a serious situation where the address information can no longer be read is included in this small defect error.

When a predetermined cause of access failure repeatedly occurs in a predetermined nearby range on the optical disk 20, the system controller 18 judges that a defect of the optical disk 20 has occurred at the nearby range. Further, when this cause of access failure is not a serious cause of failure to the extent where the address information can no longer be read, the system controller 18 judges that a small defect has occurred at the optical disk 20. When an error resulting in a temporary loss of lock in focus control or tracking control at the servo controller 17 or an error resulting in the clock signal reproduction processing at the read processor 11 occurs in a predetermined nearby range on the optical disk 20, the system controller 18 judges that a small defect on the optical disk 20 has caused the access failure (at this step, the seek operation).

When judging that a small defect on the optical disk 20 has caused failure in the seek operation, the system controller 18 executes the predetermined error processing (step ST124). For example, the system controller 18 changes the target address of the start of R/W access to a position exactly a predetermined address width (first address width) from the failed initial access address and again executes the R/W access.

When judging that a small defect has caused failure in the seek operation, the system controller 18 judges if the address information can be read from the optical disk 20 (step ST126). For example, the servo controller 17 judges if an error has occurred that caused a complete loss of lock of the servo control. When such an error prevents the address information from being read out, the system controller 18 executes the later explained reference position stopping operation (step ST128).

On the other hand, when the address information can be read, it is assumed that the error is due to a vibration, so the system controller 18 returns to step ST100 and executes the R/W access processing again.

When judging at step ST120 that the seek operation ended in a normal manner, the system controller 18 performs control to advance the position of the emitted laser beam from the address after the seek operation to the target address of the start of R/W access. Further the system controller 18 monitors for the occurrence of predetermined errors until reaching the target address of the start of R/W access. For example, the system controller 18 monitors for errors resulting in a loss of lock of the focus control or tracking control at the servo controller 17 or errors resulting in the position of the emitted laser beam deviating from one track before the start of the target address (step ST130, ST132, ST134).

When such an error occurs, the system controller 18 judges if the error is due to a shock or other external factors (step ST136). Details of this judgment are explained with reference to FIG. 7. When judging that the error has occurred due to a shock or other external factors, the system controller 18 returns to step ST100 where it executes the R/W access processing again.

On the other hand, when judging that the error has occurred due to a defect of the optical disk 20, the system controller 18 judges if the cumulative number (D-Retry) of times when it has rendered a judgment that a defect of the optical disk 20 has caused the access failure exceeds the above-mentioned upper limit value of the number of retries Nd (step ST138). When the upper limit value is not exceeded, the system controller 18 adds 1 to the cumulative number D-Retry, then returns to step ST100 and again executes the R/W access processing. When the cumulative number D-Retry exceeds the upper limit value, the system controller 18 ends the retry operation of access and performs defect error processing (see FIG. 8) (step ST140).

When judging at step ST134 that the position of the emitted laser beam has reached the target address of the start of R/W access, the system controller 18 judges if the R/W access can be started or not (step ST142). For example, the system controller 18 determines if there is a sufficient empty region in the FIFO unit 2.

When judging that R/W access may not be started, the system controller 18 compares the above-mentioned timer value and internal factor timeout time Ti (step ST144). When the timer value does not exceed the internal factor timeout time Ti, the system controller 18 returns to step ST100 where it executes the R/W access processing again, while when it exceeds it, the system controller 18 executes predetermined error processing (step ST146). For example, the system controller 18 performs processing to notify the external device that an internal factor of the FIFO unit 2 has caused a failure in the start of R/W access.

When judging at step ST142 that RAW access can be started, the system controller 18 starts the R/W access (step ST148). Further, if no error occurs during access, the system controller 18 ends the R/W access processing.

On the other hand, if an error occurs during access, the system controller 18 judges if the error is due to poor emission of the laser diode 7 or due to poor control of the power controller 6 (step ST152).

When judging that an error due to an internal factor occurs, the system controller 18 judges if the cumulative number (I-Retry) of times it rendered a judgment that an error due to an internal factor caused failure of access is over the above-mentioned upper limit value of the number of retries Ni. When this upper limit value is not exceeded, the system controller 18 adds 1 to the cumulative number I-Retry, then returns to step ST100 where it again executes R/W access processing. When the cumulative number I-Retry exceeds the upper limit value, the system controller 18 executes predetermined internal error processing (step ST156). For example, the system controller 18 performs processing to notify an external device that an internal factor of the laser diode 7 has caused failure of R/W access.

When judging at step ST152 that the error did not occur due to an internal factor of the laser diode 7, the system controller 18 judges if the error is due to a defect of the optical disk 20 (step ST158).

When it is judged at step ST158 that there is no error due to a defect of the optical disk 20, the system controller 18 returns to step ST100 and executes the R/W access processing again.

On the other hand, when judging that a defect of the optical disk 20 has caused the error, the system controller 18 judges if the cumulative number D-Retry of the judgments of defects has exceeded the above-mentioned upper limit value of the number of retries Nd (step ST160). When not exceeding this upper limit value, the system controller 18 adds 1 to the cumulative number D-Retry, then returns to step ST100 and again executes the R/W access processing. When the cumulative number D-Retry exceeds the upper limit value, the system controller 18 ends the retry operation of access and executes defect error processing (see FIG. 8) (step ST162).

Above, the R/W access processing shown in FIG. 2 to FIG. 4 is explained.

Details of the reference position stopping operation of steps ST110, ST128 of FIG. 2 are explained below.

Figure 5:
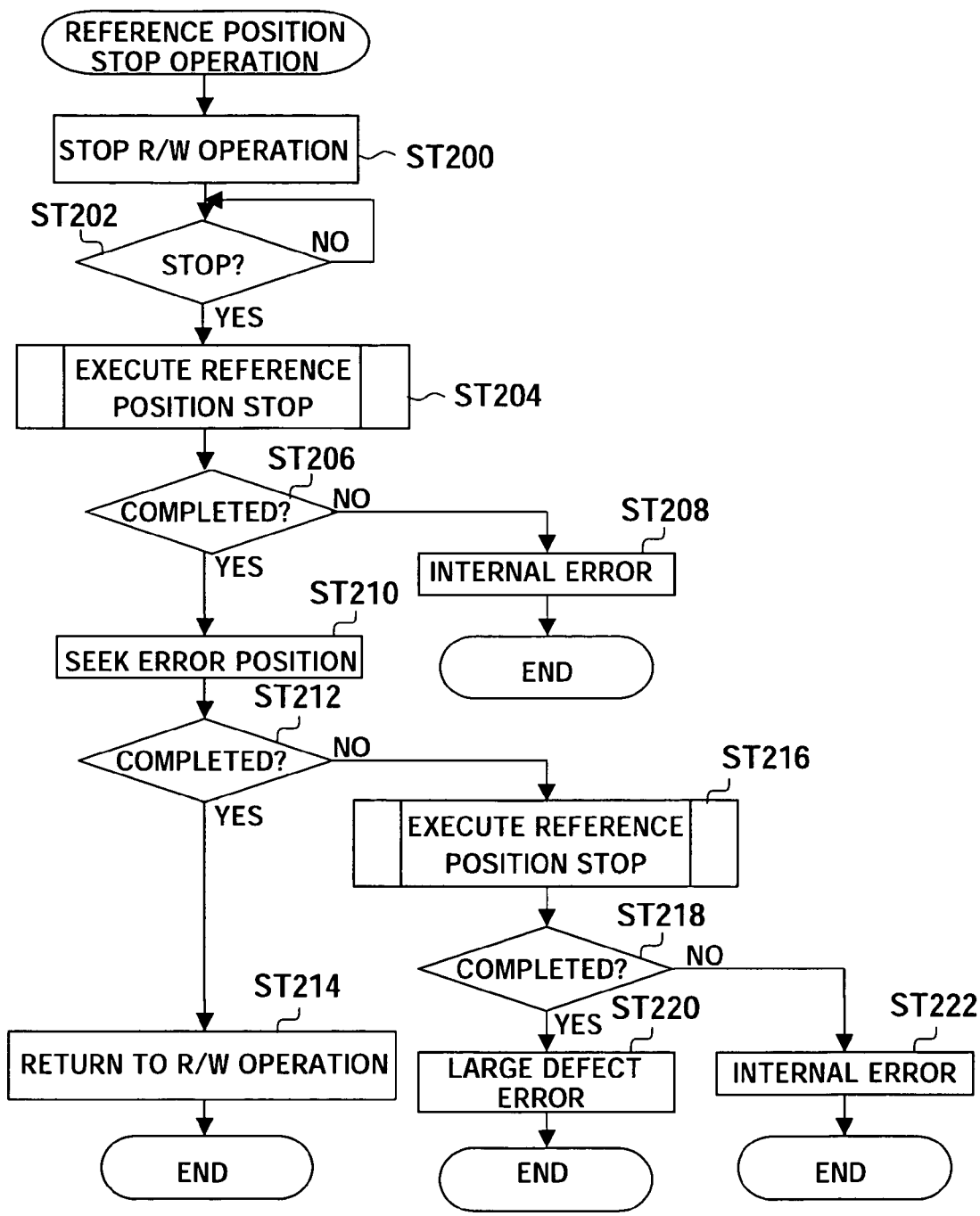
FIG. 5 is a first flow chart illustrating processing when executing a reference position stopping operation.
Figure 6:
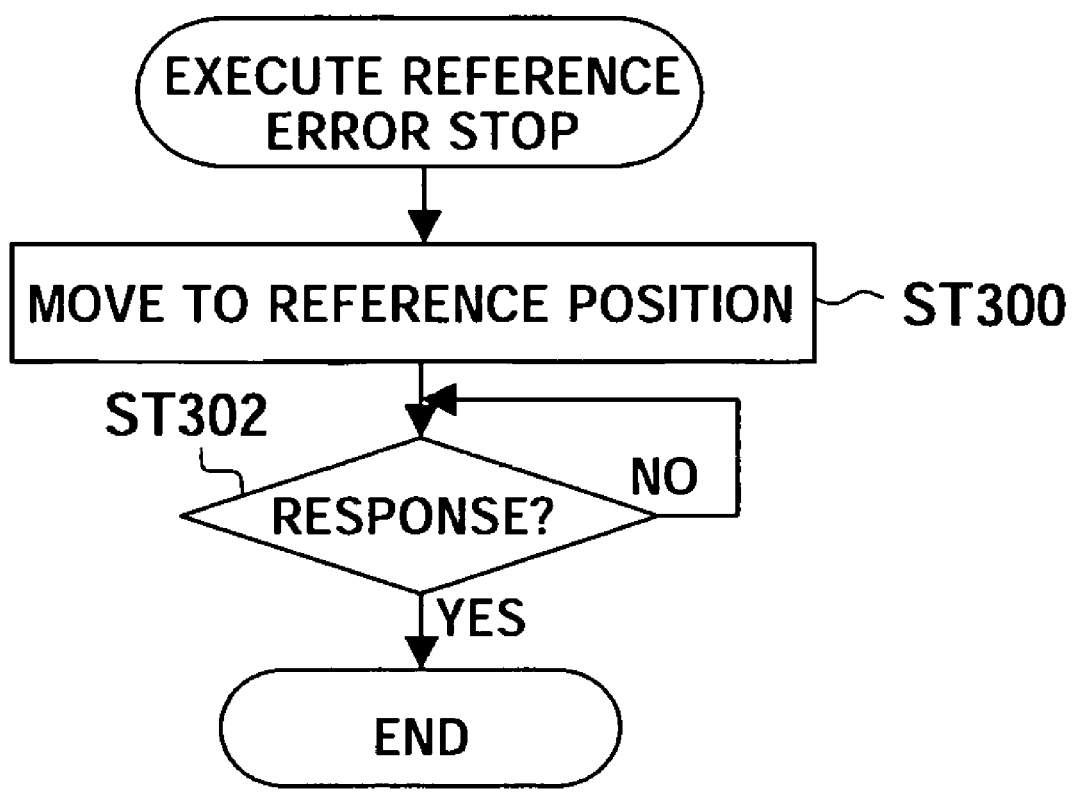
FIG. 6 is a second flow chart illustrating processing when executing a reference position stopping operation.

FIG. 5 and FIG. 6 are flow charts of the processing at the time of execution of the reference position stopping operation.

First, the system controller 18 performs the processing for stopping the operation relating to the R/W access (step ST200) and confirms that the emission of light from the laser diode 7 has stopped (step ST202).

After confirming that the operation relating to R/W access has stopped, the system controller 18 executes processing for moving and stopping the position of the emitted laser beam at a predetermined reference position of the optical disk 20 (for example, a region at the innermost circumference of the optical disk 20) (step ST204).

FIG. 6 is a flow chart of the processing at step ST204.

The system controller 18 executes an instruction for moving the position of the emitted laser beam to a predetermined reference position of the optical disk 20 (step ST300), then confirms a response from the optical pickup informing the system controller 18 that the movement has ended (step ST302).

In confirming movement of the position of the emitted laser beam, the system controller 18 determines if the optical disk 20 can be accessed at this reference position (step ST206). For example, the system controller 18 determines if the address information can be read out at the reference position. When the optical disk 20 is not accessed at the reference position or when a signal indicating failure of movement of the position of the emitted laser beam is output from the optical pickup 5, the system controller 18 executes predetermined internal error processing (for example, processing for notifying an external device that an internal factor has caused the reference position stopping operation to fail) and ends the reference position stopping operation (step ST208).

When the address information can be read out at the reference position, the system controller 18 executes a seek operation at the position where the error occurred, before calling up the reference position stopping operation (step ST210). Further, the system controller 18 executes processing to, for example, read the address information at the seek position and judge if the seek operation ended in a normal manner (step ST212). When the result of confirmation is that the seek operation could be performed in a normal manner, the system controller 18 executes processing for returning to the R/W access operation and ends the reference position stopping operation (step ST214).

When judging at step ST212 that the seek operation has failed again, the system controller 18 moves the laser beam position to the reference position shown in FIG. 6 (step ST216) and determines if the optical disk 20 can be accessed at the reference position (step ST218). When the optical disk 20 is not accessed at the reference position, the system controller 18 executes the predetermined internal error processing and ends the reference position stopping operation (step ST222).

On the other hand, when the address information can be read out at the reference position, the system controller 18 judges that a large defect error occurred at the position where it was judged at step ST212 that the seek operation failed and executes predetermined error processing (step ST220).

A large defect error refers to an access error occurring due to a defect of a relatively broad range of the optical disk 20. For example, if there is a large defect extending in the circumferential direction, a state where the lock of servo control in the servo controller 17 is completely lost or a state where the clock signal can no longer be reproduced from the wobble signal in the read processor 11 occurs and the address information can no longer be read. This case is included in large defect error detection.

When judging that a large defect has occurred on the optical disk 20, the system controller 18, for example, changes the target address of the start of R/W access to a position away from the initial failed address to be accessed by a predetermined address width (second address width) and executes the R/W access again. The second address width in this case is set longer than the first address width in the case where a small defect occurs. That is, the width of the changed address is suitably set in accordance with the size of the predicted defect.

The processing for judgment of the cause of error at step ST136 of FIG. 3 or step ST158 of FIG. 4 is explained.

Figure 7:
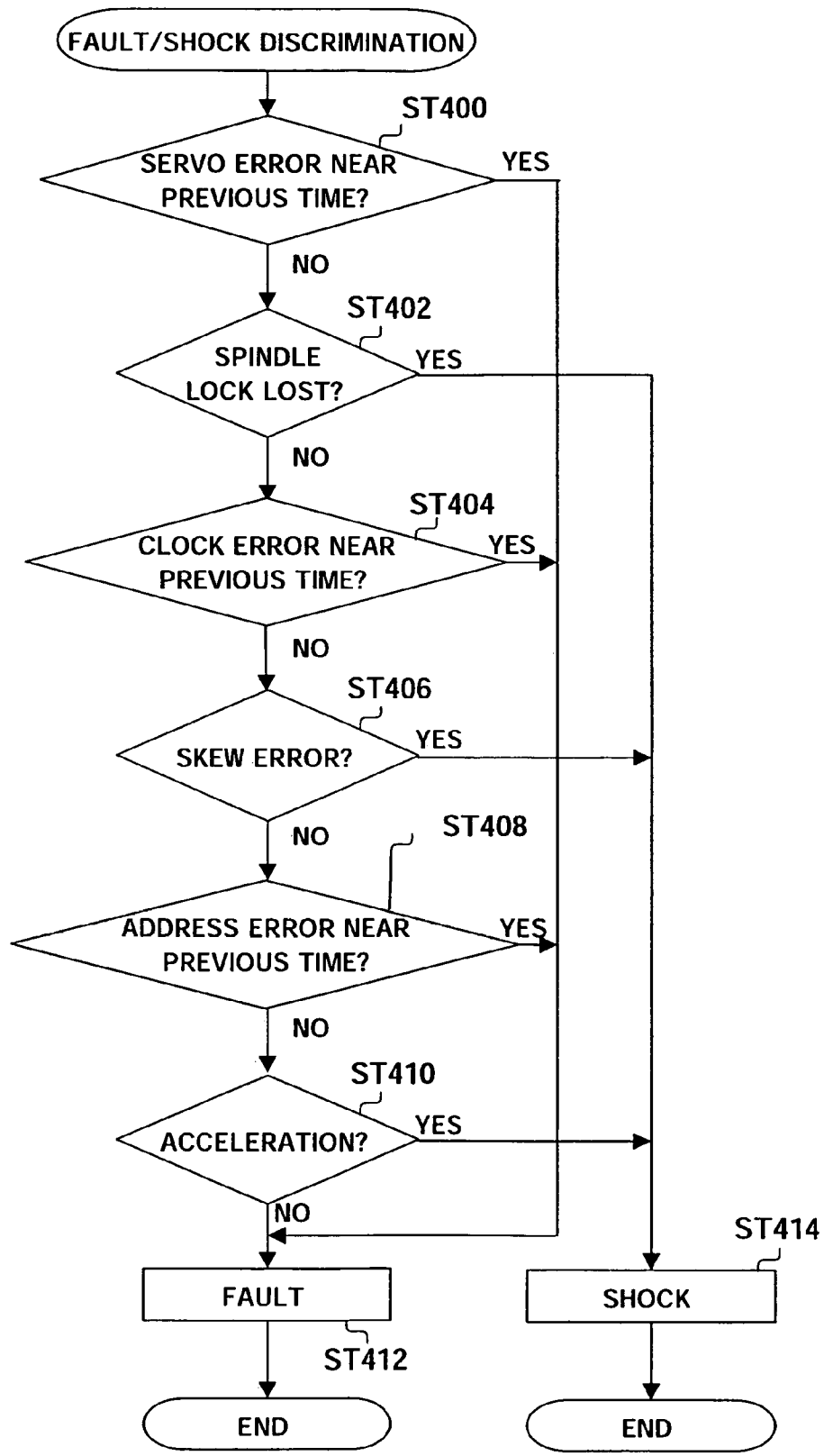
FIG. 7 is a flow chart of error cause judgment processing.

FIG. 7 is a flow chart illustrating error judgment processing for judging if an access error occurred due to a defect of the optical disk 20 or due to a vibration.

First, the system controller 18 judges if, in the retry of access, poor servo control of the servo controller 17 (temporarily loss of lock of servo control) repeatedly occurs in a predetermined nearby range on the optical disk 20 (step ST400).

For example, the system controller 18 judges if the distance between the position on the optical disk 20 where the poor servo control occurred in the previous access error and the position on the optical disk 20 where the poor servo control occurred in the current access error is shorter than a predetermined distance.

When judging that poor servo control repeatedly occurs in the nearby range, the system controller 18 renders a judgment that a defect of the optical disk 20 caused access error and ends the error judgment processing (step ST412).

When judging at step ST400 that poor servo control does not repeatedly occur in a close range, the system controller 18 judges at the time of access failure if poor control of the rotational speed at the motor controller 15 occurred (step ST402).

Poor control of the rotational speed may not occur due to a defect of the optical disk 20, so at the time of access failure, if the motor controller 15 experiences poor control of the rotational speed, the system controller 18 judges that a vibration caused the access error to occur and ends the error judgment processing (step ST414).

When judging at step ST402 that, at the time of access failure, poor control of the rotational speed has not occurred, the system controller 18 judges, in access retries, if poor clock signal reproduction processing of the read processor 11 (loss of lock of PLL circuit used for reproduction of the clock signal) repeatedly occurred in a predetermined nearby range of the optical disk 20 (step ST404).

When judging that poor clock signal reproduction processing repeatedly occurred in the predetermined nearby range, the system controller 18 renders a judgment that a defect of the optical disk 20 caused the access error and ends the error judgment processing (step ST412).

When judging at step ST404 that poor clock signal reproduction processing does not repeatedly occur in the predetermined nearby range, the system controller 18 judges at the time of access failure if the skew of the optical disk 20 detected by the skew detector 12 exceeds a predetermined threshold value (step ST406).

Tilt of the optical disk 20 may not occur due to a defect of the optical disk 20, so at the time of access failure, if a skew over the threshold value is detected, the system controller 18 renders a judgment that a vibration has caused the access error and ends the error judgment processing (step ST414).

When judging at step ST406 that, at the time of access failure, a skew over the threshold value is not detected, the system controller 18 judges during the access retry, if poor address information reproduction processing of the read processor 11 repeatedly occurred in the predetermined nearby range of the optical disk 20 (step ST408).

When judging that poor address information reproduction processing repeatedly occurred in the predetermined nearby range, the system controller 18 renders a judgment that a defect of the optical disk 20 caused the access error and ends the error judgment processing (step ST412).

When judging at step ST408 that the poor address information reproduction processing does not repeatedly occur in the predetermined nearby range, the system controller 18 judges if the a vibration detected by the vibration detector 13 at the time of access failure exceeded a predetermined threshold value (step ST410).

Vibration may not occur due to a defect of the optical disk 20, so at the time of access failure, if a vibration over the threshold value is detected, the system controller 18 judges that a vibration has caused the access error and ends the error judgment processing (step ST414).

On the other hand, when it is judged at step ST410 that, at the time of access failure, a vibration over the threshold value was not detected, the system controller 18 renders a judgment that a defect of the optical disk 20 has caused the access error and ends the error judgment processing (step ST412).

The defect error processing at step ST140 of FIG. 3 and step ST162 of FIG. 4 is explained.

Figure 8:
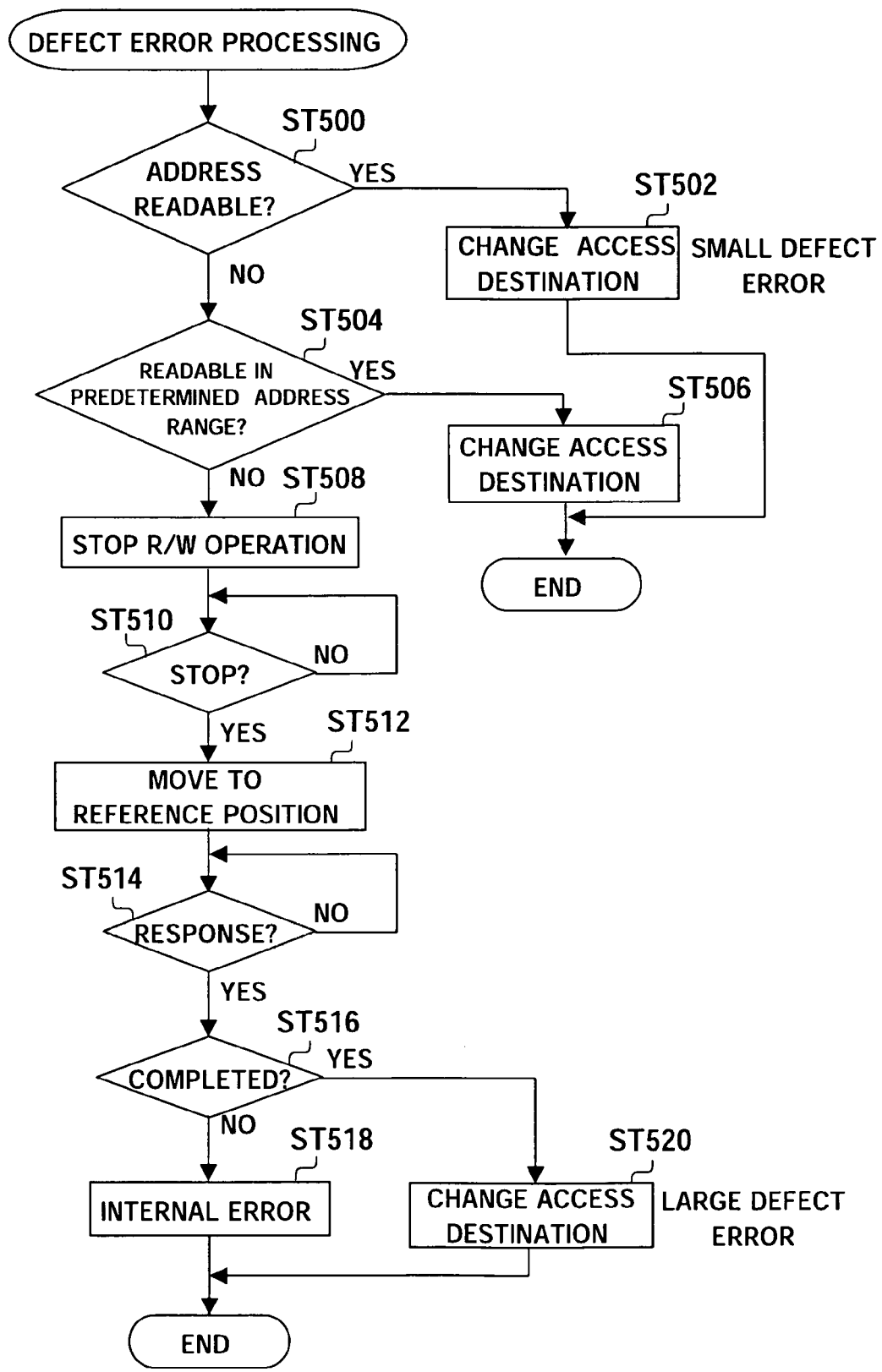
FIG. 8 is a flow chart of defect error processing.

FIG. 8 is a flow chart of defect error processing executed when judgment that a defect of the optical disk 20 caused failure in access exceeds the upper limit number.

First, the system controller 18 judges if the address information can be read from the optical disk 20 (step ST500). For example, the system controller 18 judges if an error has occurred, such as the servo controller 17 ending up with a complete loss of lock of servo control. When such error does not occur and the address information can be read out, the system controller 18 changes the accessed destination to an address exactly the width of the first address away and decides to execute the R/W access again and ends the defect error processing (step ST502). In this case, the system controller 18 deems the defect of the optical disk 20 to be a small defect and sets the extent of change of the address.

When judging at step ST500 that the address information may not be read out, the system controller 18 searches for a readable address in the range of a predetermined address from the address failed to be accessed (step ST504). Further, if there is a readable address in this address range, the system controller 18 changes the accessed destination to this address and decides to execute the R/W access again and ends the defect error processing (step ST506).

When judging at step ST504 that there is no readable address in a predetermined address range, the system controller 18 performs processing for moving the position of the emitted laser beam to the reference position to determine if access is possible at a reference position of the optical disk 20 (step ST508, ST510, ST512, and ST514). This processing is the same as the processing explained steps ST200, ST202, ST300, and T302.

In confirming movement of the position of the emitted laser beam, the system controller 18 determines if access to the optical disk 20 is possible at this reference position (step ST516). For example, the system controller 18 determines if the address information can be read out at this reference position. When the optical disk 20 is not accessed at the reference position or a signal indicating failure of movement of the position of the emitted laser beam is output from the optical pickup 5, the system controller 18 executes the predetermined internal error processing and ends the defect error processing (step ST518).

When the address information can be read at the reference position, the system controller 18 decides to change the access destination to an address away by exactly the second address width and execute the R/W access again and ends the defect error processing (step ST520). In this case, the system controller 18 estimates that the defect of the optical disk 20 is the above-mentioned large defect and sets the amount of change of the address.

As explained above, according to the optical disk device according to the present embodiment, if poor servo control, poor clock signal reproduction processing, or another predetermined cause of access failure repeatedly occurs in a predetermined nearby range on the optical disk 20, the system controller judges that a defect of the optical disk 20 caused the access failure.

Therefore, access failure occurring due to a defect of the optical disk 20 can be clearly distinguished from access failure occurring due to another factor. Due to this, suitable processing is possible for access failure occurring due to a defect of the optical disk 20.

Further, in the optical disk device, in retry of access, if poor servo control, poor clock signal reproduction processing, or another cause of access failure occurs repeatedly in the predetermined nearby range of the optical disk 20, at the time of access failure, if a vibration detected by the vibration detector 13 exceeds a predetermined threshold value, it is judged that the vibration caused the access failure, while if the detected vibration does not exceed the predetermined threshold value, it is judged that a defect of the optical disk 20 caused the access failure.

Therefore, if access failure occurred due to a defect of the optical disk 20 and if access failure occurred due to the vibration applied from an external source, the failures can be clearly distinguished. Due to this, there is less mistaken judgment of access failure due to a defect of the optical disk 20 and access failure due to the vibration and suitable error processing for the respective causes of failure can be performed.

Further, in the optical disk device, when judgment that a defect of the optical disk 20 has caused access failure is repeated more than the upper limit value of the number of retries Nd, the retry of access is ended and defect error processing is executed. When judgment that a vibration caused access failure is repeated over the external factor timeout time Ts, the retry of access is ended and predetermined error processing for external factors is executed.

Due to this, the conditions for shifting to the error processing can be set separately for the case where a defect of the optical disk 20 caused the failure in access and the case where the vibration caused the access failure.

Normally, when access failure occurs due to a defect in the optical disk 20, even if repeatedly retrying access attempts, the wasted processing time ends up becoming longer. As opposed to this, when access failure due to a vibration occurs, there is a good chance that access will become possible after a predetermined time, so it is necessary to set the number of retries at a high number. Therefore, it is possible to clearly distinguish between access failure due to a defect of the optical disk 20 and access failure due to a vibration and suitably set the retry time or number of retries of access in accordance with the determined cause of failure. As a result, it is possible to suitably perform the error processing in accordance with the cause of failure while suppressing wasted processing time due to a high number of retries or attempts.

Further, when a defect of the optical disk 20 causes access failure due to the designated address on the optical disk 20, if the address information can be read from the optical disk 20, the access destination is changed to an address exactly the first address width away from the address failed to be accessed. On the other hand, if the address information is not read, it is investigated if access is possible at a predetermined reference position of the optical disk 20. Further, if this determination shows that access at the reference position is possible, the access destination is changed to an address away from the address failed to be accessed by exactly the second address width longer than the first address width.

Therefore, when the estimated magnitude of the defect is relatively large, the access destination is changed to a position further away compared with when it is estimated to be small, so that access can be accomplished while suppressing an increase in wasted memory area when access is skipped.

In particular, when writing data that is transmitted in real time to an optical disk 20, if a delay in the write processing due to access failure becomes prolonged, the FIFO unit 2 may overflow, so it is preferable to restart the write operation as fast as possible. In this respect, according to the above method of jumping to a position away by exactly a preset address width, it is possible to restart the write operation at a higher speed compared with the method of endlessly searching for an accessible address, so it is possible to effectively avoid overflow of the FIFO unit 2.

Third Embodiment

A third embodiment of the present invention is explained.

The third embodiment is an embodiment relating to judgment as to whether or not the tracking error has become larger than a predetermined limit.

Figure 9:
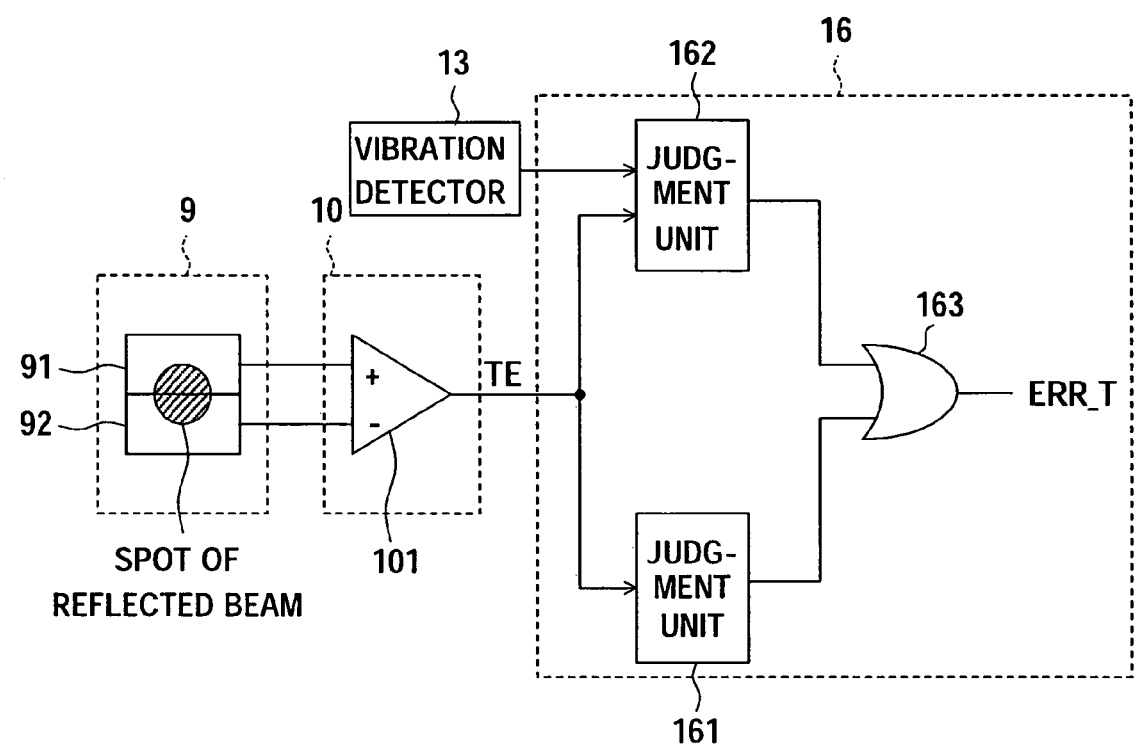
FIG. 9 is an example of a configuration judgment of tracking error in an optical disk device according to the invention.

FIG. 9 is an example of the configuration of the part relating to judgment of a tracking error in the optical disk 20. The same reference numerals in FIG. 9 and FIG. I indicate the same components. Note that the rest of the configuration of the optical disk device other than the part relating to judgment of a tracking error shown in FIG. 9 is the same as the optical disk device shown in FIG. 1.

In the example of FIG. 9, the photosensor 9 has optical detectors 91 and 92. The RF signal processor 10 has a differential amplifier 101. The servo controller 16 has judgment units 161, 162, and 163.

The unit including the judgment units 161, 162, and 163 is an embodiment of the tracking error judgment unit.

The optical detectors 91 and 92 convert the beams reflected from the optical disk 20 to electrical signals. The optical detectors 91 and 92, for example, as shown in FIG. 9, are arranged symmetrically on a plane. When an information track is struck at its center part with a laser beam, the levels of the output signals of the optical detectors 91 and 92 become substantially equal.

The differential amplifier 101 amplifies and outputs the difference in the output signal levels of the optical detectors 91 and 92. The output signal TE of the differential amplifier 101 corresponds to the detected value of the deviation of the position of the emitted laser beam with respect to the information track (tracking error).

The judgment unit 161 judges that the magnitude of the tracking error has reached the first error judgment reference when the magnitude of the output signal TE of the differential amplifier 101, that is, the magnitude of the tracking error detected by the differential amplifier 101, exceeds a threshold value THA over a time TA.

The judgment unit 162 judges that the magnitude of the tracking error has reached a second error judgment reference when the vibration detected by the vibration detector 13 has become greater than a predetermined threshold value and the magnitude of the signal TE exceeds a threshold value THB over a time TB. However, the threshold value THB is larger than the threshold value THA, and the time TB is shorter than the time TA.

When the magnitude of the tracking error reaches the first error judgment reference or the second error judgment reference at the judgment unit 161 or 162, the judgment unit 163 outputs a signal ERR_T indicating that the tracking error has become larger than a certain limit, that is, poor tracking control has occurred.

According to the above-mentioned configuration, when the vibration detected by the vibration detector 13 is smaller than a predetermined threshold value, it is judged if it has reached a first error judgment reference. When the vibration detected by the vibration detector 13 is larger than the predetermined threshold value, in addition to this first error judgment reference, it is judged if a second error judgment reference has been reached.

FIG. 10 is an example of a waveform of the output signal TE of the differential amplifier 101 under various conditions.

Figure 10A:
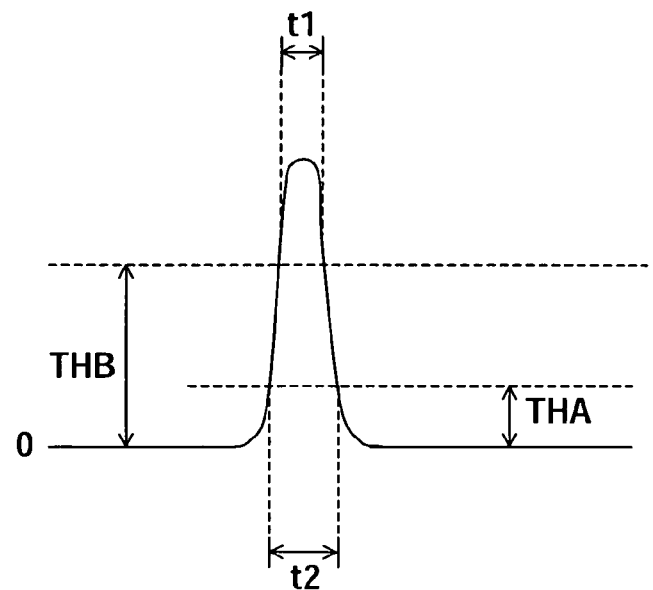
FIG. 10 is an example of the waveform of a detection signal of tracking error when strong vibration is applied or the case where the optical disk suffers from a defect.

FIG. 10(A) shows a waveform of the signal TE in the case where the optical disk device receives strong shock. In this case, the signal TE gives rise to a large peak in a relatively short time.

Figure 10B:
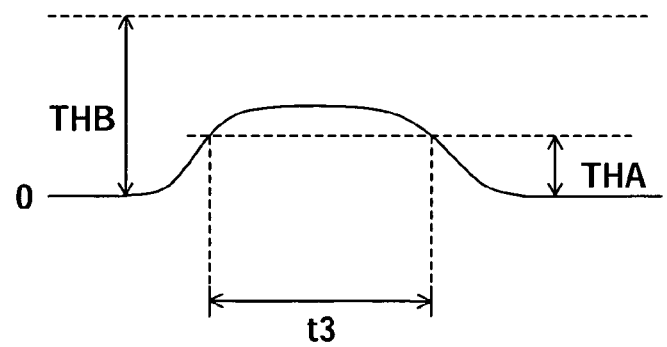

FIG. 10(B) shows a waveform of the signal TE in the case where the optical disk 20 has a defect. In this case, the signal TE has a low peak continuing for a longer time than with shock.

Figure 10C:
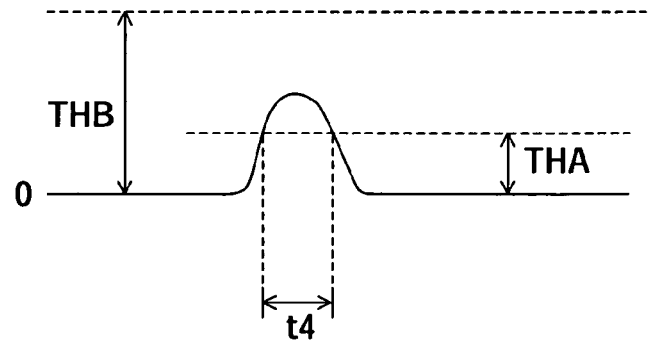

FIG. 10(C) shows a waveform of the signal TE in the case where the optical disk 20 has a minor defect. In this case, the signal TE has a low peak continuing for a shorter time than with shock.

It is necessary to judge whether or not a tracking error has exceeded a certain limit in the case shown by this waveform example in the case of FIG. 10(A) and FIG. 10(B). In the case of FIG. 10(C), that is, the case where a minor defect occurs in the optical disk 20, no problem usually occurs even with continuing access, so it is preferable to not judge that a tracking error has exceeded a predetermined limit.

However, in a conventional optical disk device, in general a single judgment standard is used to judge whether or not a tracking error has occurred, so there is a problem where a strong shock is applied and the case where a minor defect occurs easily are not easily distinguished. For example, in the examples of waveforms of FIG. 10, if judging by only the first judgment standard (threshold value THA, time TA), since the pulse widths t2 and t4 in the cases of FIG. 10(A) and FIG. 10(C) are close, distinguishing the two is difficult. In recent years, along with a higher speed of the optical disk 20, the pulse widths of minor defects have become smaller and have approached the pulse width of strong shock, so distinguishing the two has become difficult.

If the error judgment reference is eased so that occurrence of a minor defect is not judged as an error, when a high speed signal TE such as shown in FIG. 10(A) is detected due to strong shock, a delay in error judgment occurs and overwriting of memory content or other problems may occur. Conversely, if the error judgment reference is made too severe, the operation may be interrupted by error judgment even in the case of a minor error where recording and reproduction can be continued.

As opposed to this, according to the method of judgment of the optical disk device according to the above-mentioned present embodiment, different judgment standards are used when the vibration detected by the vibration detector 13 exceeds a predetermined threshold value or does not exceed a predetermined threshold value.

That is, when the vibration detector 13 detects more than a predetermined amount of vibration, both the first judgment standard (threshold value TA, time TA) and second judgment standard (threshold value TB, time TB) become valid, so in addition to errors due to a defect of the optical disk 20 (FIG. 10(B)), it becomes possible to reliably judge errors due to a strong shock (FIG. 10(A)).

On the other hand, when the vibration detector 13 does not detect more than a predetermined amount of vibration, only the first judgment standard (threshold value TA, time TA) becomes valid, so it is possible to prevent mistaken judgment when minute defects occur (FIG. 10(C)).

Therefore, according to the optical disk device according to the above-mentioned embodiment, by suitably setting the standard for judgment, if deviation of the emitted position of the beam on the information track of the optical disk 20 due to vibration given from an external source exceeds a predetermined limit, it is possible to raise the precision of judgment. Due to this, it is possible to reliably determine errors occurring due to a strong shock. Further, cases where the occurrence of minor defects in the optical disk 20 are mistakenly judged as errors are reduced, there is less useless interruption of recording and reproduction and less storage region unused due to mistaken judgment. As a result, it is possible to reduce wasteful information in the storage region.

Fourth Embodiment

A fourth embodiment of the present invention is explained.

The fourth embodiment is an embodiment relating to a control of the rotational speed of the optical disk 20.

The optical disk device according to the fourth embodiment, for example, has a configuration similar to the optical disk device shown in FIG. 1. However, for control of the rotational speed of the optical disk 20, the system controller 18 performs the control as explained below.

When the position of the emitted laser beam of the optical pickup 5 is in the region from the center of the optical disk 20 to the predetermined track, the system controller 18 instructs the rotational speed of the motor controller 15 so that the rotational speed of the optical disk 20 becomes constant. On the other hand, when the position of the emitted laser beam is from the predetermined track to the peripheral side of the optical disk 20, the system controller 18 instructs the rotational speed of the motor controller 15 so that the position of the emitted laser beam moves at a constant speed on the information track of the optical disk 20.

Due to this, when the distance from the center of the disk of the optical disk 20 to the position of the emitted laser beam is shorter than a predetermined distance, the optical disk 20 is driven at a constant rotational speed. On the other hand, when the distance from the center of the disk is longer than a predetermined distance, the optical disk 20 is driven to rotate so that the speed of the position of the emitted laser beam moving on the information track becomes constant.

FIG. 11 shows a relationship between the distance from the center of the optical disk 20 and the rotational speed of the optical disk 20.

As shown in FIG. 11, the system controller 18 performs processing to access the optical disk 20 in the CAV mode, by holding the rotational speed constant when the position of the emitted laser beam is in a range up to the distance R from the center of the optical disk 20. Further, the system controller 18 performs processing to access the optical disk 20 in the CLV mode, by holding the speed of the position of the emitted laser beam (linear velocity) moving on the information track constant at a position where the position of the emitted laser beam is away from the center of the optical disk 20 by the distance R.

Further, the system controller 18 controls the rotational speed at the CAV mode or the linear velocity at the CLV mode when performing the above operation to switch between the CAV mode and CLV mode.

That is, when operating in the CAV mode for controlling the rotational speed of the optical disk 20 to be constant, the system controller 18 instructs the rotational speed of the motor controller 15 so that the rotational speed of the spindle motor 16 becomes the rotational speed of the predetermined upper limit at the spindle motor 16.

When operating in the CLV mode, thus controlling the linear velocity to be constant, the system controller 18 instructs the rotational speed of the motor controller 15 so that the frequency of the output signal of the optical pickup 5 becomes the frequency of the predetermined upper limit that is processed in the RF signal processor 10.

Normally, the CLV mode is faster when it comes to accessing a continuous region along the information track compared to the CAV mode. Therefore, the CLV mode is more advantageous when accessing a continuous region at a high speed. However, a conventional optical disk device operates in either the CLV mode or the CAV mode, so performance limits of the rotational speed of the spindle motor require that access speed be sacrificed.

That is, in the CLV mode, the more to the inside of the optical disk, the higher the speed the optical disk has to be rotated, so performance limits of the rotational speed of the spindle motor result in the linear velocity being limited. When a frequency of the RF signal from the optical pickup at the limited linear velocity is lower than the frequency of the upper limit that can be processed in the RF signal processing circuit, the original access speed performance may not be sufficiently exhibited.

On the other hand, according to the above-mentioned optical disk device according to the present embodiment, in the region at the inside of the optical disk 20 where the rotational speed of the spindle motor reaches its limit, the CAV mode is used for access, while at the region at the outside of the optical disk 20 where the frequency band of the RF signal processor 10 reaches its limit, the CLV mode is used for access. Due to this, it is possible to realize as high a speed of access as possible within the range of the performance limits of the spindle motor 16 and RF signal processor 10.

Further, since the maximum performances can be extracted from the spindle motor 16 and RF signal processor 10, it is possible to greatly improve the access speed of the CAV mode and the data transfer rate of the CLV mode.

Fifth Embodiment

A fifth embodiment of the present invention is explained.

The fifth embodiment is an embodiment relating to an increasing of a seek speed.

The optical disk device according to the present embodiment has a similar configuration to, for example, the optical disk device shown in FIG. 1 and accesses an optical disk as, explained below.

That is, the optical disk to be accessed in the present embodiment has an information track formed in a spiral configuration. This information track is divided into a plurality of sections that are each assigned addresses. In each section, information required for reproducing the assigned address is continuously recorded along the information track.

This structure of an optical disk corresponds, for example, to an optical disk based on the standard called "Blu-ray".

The information track of the Blu-ray disk is divided into 64 Kbyte sections called a "RUB". One RUB is further divided into three sections. In these three sections, one address information is recorded.

The address information in a section is continuously recorded along the information track by the method of modulating the periodic shape of the wobble in accordance with the address information. Therefore, to reproduce one address information, it is necessary to trace a section of ⅓ of 1 RUB.

When moving the emitted position of the laser beam in the circumferential direction of such an optical disk, a general optical disk device moves the emitted position in one predetermined direction along the information track. For example, during access, the emitted position of the laser beam may not be made to move in the opposite direction.

FIG. 12 is an example of a seek operation in a general optical disk device.

In FIG. 12, the symbols 'T(n−1)', 'T(n)', . . . indicate information tracks, while the symbols 'S(i)', 'S(i+1)', . . . indicate sections dividing the information tracks. Further, the symbols 'A1' to 'A3' indicate addresses on the information track.

The optical disk device moves the emitted position of the laser beam in one direction in the order of the track T(n−1), T(n), T(n+1), . . . .

Figure 12A:
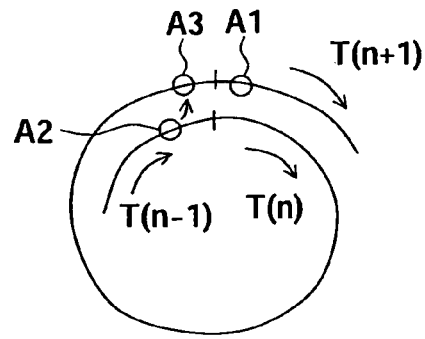
FIG. 12 is an example of a seek operation in a general optical disk device.

In the example of FIG. 12(A), the address A2, before the seek operation is positioned at the track T(n−1), the address A1 to be accessed is positioned at the track T(n+1). If the seek operation is executed, the emitted position of the laser beam is moved to the address A3 of the track T(n), one track before the track T(n+1) of the address A1 to be accessed.

Figure 12B:
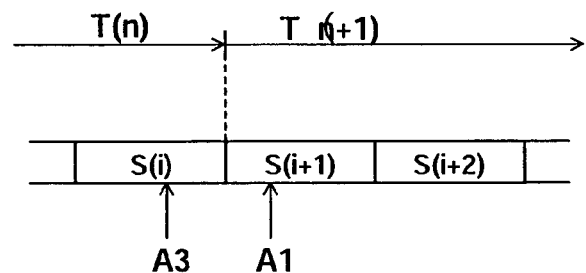

In a general optical disk device, to jump in address to one track before a track where the accessed address is positioned, for example, as shown in FIG. 12(B), sometimes the address A3 jumped to is included in one section S(i) before the section S(i+1) includes the accessed address A1. As explained above, to reproduce one address information, it is necessary to trace one section, so in this case, when tracing in the direction from the address A3 to the address A1, the address information reproduced first becomes the address information of the section S(i+1). At the time of obtaining the address information of section S(i+1), the optical disk device can render a judgment to determine whether or not the seek operation has been correctly performed, but at this time the emitted position of the laser beam has already passed the already accessed address A1. Therefore, it is not possible to trace in the opposite direction from this position, so in this case, the optical disk device returns once to the track T(n), then again traces the information track to attempt to access the address A1.

That is, in a general optical disk device, when performing a trace operation to acquire the address information of a section, sometimes the seek target address ends up being passed. In this case, there is the problem that that the seek operation and trace operation have to be needlessly repeated.

In contrast, in the system controller 18 of the optical disk device of the present embodiment, when performing a seek operation moving the emitted position of the laser beam toward the accessed address in the radial direction of the optical disk 20, the number of turns of the information track jumped in the radial direction (number of tracks) is determined so that the emitted position of the laser beam after the seek operation is included in the section at least two sections from the accessed section when heading in the above one direction.

Figure 13:
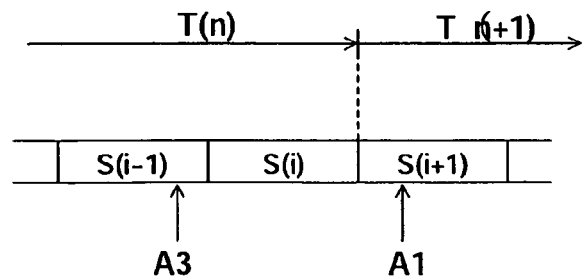
FIG. 13 is an example of a seek operation in an optical disk device.

For example, as shown in FIG. 13, the post-seek address A3 is included in the section S(i−1) two sections before the section S(i+1) including the accessed address A1. Therefore, when performing a trace operation from the post-seek position, the first reproduced address information becomes the address information of the section S(i). This address information can be acquired before the emitted position of the laser beam reaches the accessed address A1. Therefore, the system controller 18 confirms that the seek operation was performed in a normal manner based on the acquired address information, and can access the address A1 without going back.

Note that the system controller 18 may also perform processing for detecting read errors of the address information after the seek operation. That is, after the seek operation ends, it may perform a trace operation to acquire the address information of two adjoining sections on the information track from the read processor 11 and detect read errors of the address information in accordance with the acquired two address. The read errors are detected, for example, by determining if the addresses shown by the acquired two address information are continuous.

Figure 14:
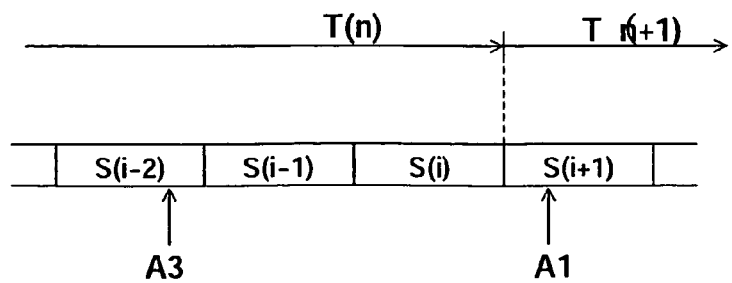
FIG. 14 is an example of a seek operation in an optical disk device.

When detecting read error of this address information, it is necessary to set the emitted position of the laser beam after the seek operation to one further section in front compared with the case shown in FIG. 13 (FIG. 14).

That is, when the system controller 18 performs a seek operation, the number of tracks jumped in the radial direction is determined so that the emitted position of the laser beam after the seek operation is included in the section at least three sections from the accessed section. In accordance with this decision, the emitted position of the laser beam is moved, and then the system controller 18 performs processing for detecting the read errors of the above-mentioned address information.

For example, as shown in FIG. 14, the post-seek address A3 is included in the section S(i−2) three sections before the section S(i+1) including the accessed address A1. If performing a trace operation from the post-seek address A3, the address information of sections S(i−1) and S(i) are acquired, whereby section S(i+1) of address A1 is reached. Therefore, the system controller 18 confirms based on the acquired two address information that the seek operation has been performed in a normal manner or a read error of the address information has or has not occurred, then can access the address A1 without going back.

In this way, according to the optical disk device according to the present embodiment, reading the address information after the seek operation prevents the problem of the emitted position of the laser beam ending up passing the address for access, whereby it is possible to eliminate useless seek operation repetition and speed up the seek operation.

Sixth Embodiment

A sixth embodiment of the present invention is explained.

Figure 15:
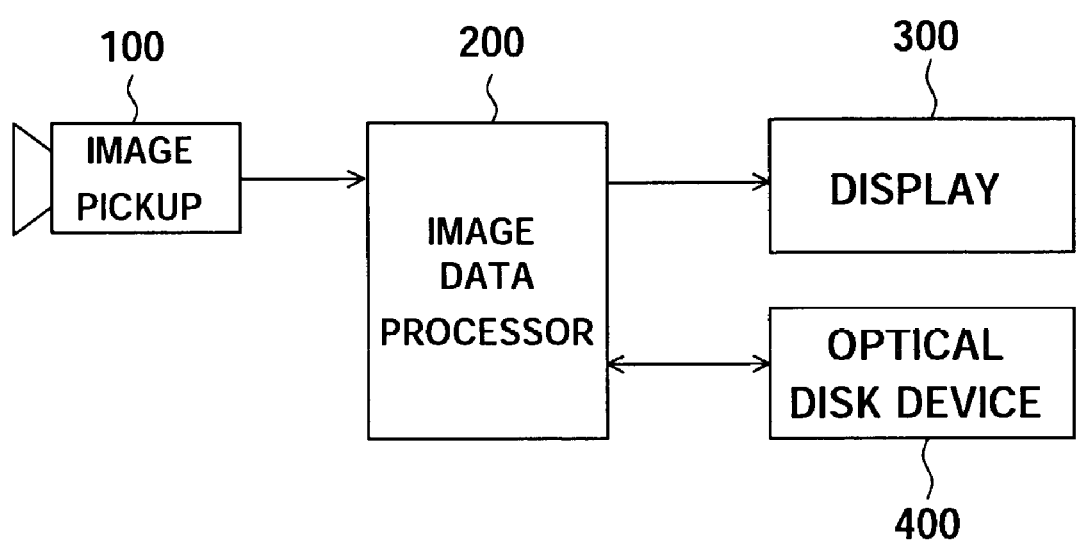
FIG. 15 is an example of the configuration of an image pickup device.

FIG. 15 is a block diagram of the configuration of an image pickup device according to a sixth embodiment of the present invention.

The image pickup device shown in FIG. 15 has an image pickup 100, an image data processor 200, a display 300, and an optical disk device 400.

The image pickup 100 picks up moving images or still images and generates image data.

The image data processor 200 processes the image data output from the image pickup 100 by coding, filtering, pixel number conversion, or other predetermined image processing and records the result in the optical disk device 400.

Further, the image data read from the optical disk device 400 is processed by decoding, filtering, pixel number conversion, or other predetermined image processing to generate the image signal supplied to the display 300.

The display 300 displays an image signal supplied from the image data processor 200.

The optical disk device 400 is an optical disk device of any of the first to fifth embodiments and records or reproduces the image data according to a command of the image data processor 200.

According to the image pickup device of the above-mentioned configuration, in the optical disk device 400, failure of access occurring due to a defect of the optical disk and access failure occurring due to a vibration applied from an external source can be clearly distinguished and suitable error processing in accordance with the cause of failure can be performed. As a result, it is possible to raise the reliability of the recording operation of image data.

Further, even when a vibration causes failure of access, the recording operation can be quickly returned to, so loss of image data produced in real time can be effectively prevented.

Since poor tracking control arising due to strong vibration can be reliably detected, loss of image data can be prevented in this regard as well.

Since the modes of rotational control of the optical disk in the optical disk device 400 are suitably switched, high-speed recording or reproduction of image data becomes possible.

Since there is no longer useless repetition of the seek operation or trace operation in the optical disk device 400, high-speed recording or reproduction of image data becomes possible.

Above, several embodiments of the present invention were explained, but the present invention is not limited to these embodiments. Various modifications are possible.

For example, the processing in the above-mentioned embodiment may be realized in at least part by a computer and program. For example, the servo controller or system controller may be realized by dedicated computers or may be realized by the same computer.

What is claimed is:

1. An optical disk device comprising:
   a rotational drive portion for driving an optical disk to rotate; and
   a controller for controlling said rotational drive portion:
   to drive said optical disk to rotate at a constant angular speed when a position of an emitted beam output from an optical pickup unit is in a region of the optical disk that is between a center of said optical disk and a first track, the first track being between the center and a periphery of said optical disk, and
   to drive said optical disk to rotate at a constant linear velocity when the position of the emitted beam output from the optical pickup unit is in a region of the optical disk that is between said first track and a track at an outer periphery of said optical disk,
   wherein said controller performs the functions of:
   performing processing for retrying to access said optical disk by the optical pickup unit when access failure occurs,
   judging whether or not the access failure is caused by a defect of said optical disk,
   judging if the access failure repeatedly occurs in a predetermined range of tracks on said optical disk,
   when said controller judges that access failure is caused by the defect of said optical disk when the optical pickup unit attempts to access a designated address on the optical disk, said controller performs processing for changing an access destination to an address separated from the address that caused a failed access attempt, by a distance that is equal to a width of a first address, and
   determining whether access to the optical disk is possible at a predetermined reference position of said optical disk and if information relating to the designated address is read by a read processor of the optical disk device, and
     when access is possible at said reference position, the controller changes the access destination to an address separated from the address that caused a failed access attempt, by a distance equal to a second address width, the second address width being longer than said first address width, and
     when access is not possible at said reference position, the controller executes a predetermined internal error processing.

2. The optical disk device as set forth in claim 1, wherein said optical disk device comprises a vibration detector for detecting a vibration occurring in the optical disk, and
said controller judges whether a vibration causes the access failure when, during the retry of said access attempts, the access failure does not repeatedly occur in said predetermined range of the tracks, and the vibration detected by said vibration detector exceeds a predetermined threshold value at a time of the access failure, and the controller judges whether the defect of said optical disk causes the access failure when said vibration does not exceed the predetermined threshold value.

3. The optical disk device as set forth in claim 1, wherein (i) a rotational speed of said optical disk is controlled to be constant by the controller when a position of an emitted beam output from a laser diode of the optical pickup unit is in the region between the center of said optical disk and the first track, and (ii) the rotational speed of the optical disk is controlled by the controller so that a position of the emitted beam moves at a constant speed on the optical disk when said position of the emitted beam is between said first track and an outer peripheral edge of said optical disk.

4. The optical disk device as set forth in claim 3, wherein said optical disk device further comprises:
   a signal processor for processing an output signal of said optical pickup unit,
   wherein, (i) when the rotational speed of said optical disk is constant, said rotational speed becomes a rotational speed of a predetermined upper limit of said rotational drive portion and (ii) a speed of movement of said position of the emitted beam on said information track controls said rotational drive portion so that a frequency of the output signal of said optical pickup unit becomes a frequency of a predetermined upper limit capable of being processed at said signal processor.

5. A method of controlling a rotation of an optical disk, the method comprising the steps of:
driving said optical disk to rotate at a constant angular speed when a position of an emitted beam output from an optical pickup unit is in a region of the optical disk that is between a center of said optical disk and a first track, the first track being between the center of said optical disk and an outer periphery of said optical disk; and
driving said optical disk to rotate at a constant linear speed when the position of an emitted beam output from the optical pickup unit accesses a region of the optical disk that is between said first track and an outer peripheral edge of said optical disk,
performing processing for retrying access attempts to said optical disk when access failure is determined and determining whether the access failure is caused by a defect of said optical disk, and
judging if the access failure repeatedly occurs in a predetermined range of the tracks on said optical disk,
when access failure is caused by a defect of said optical disk during when the optical pickup unit attempts to access a designated address on the optical disk, performing processing for changing an access destination to an address that is located away from the address that caused a failed access attempt, by a distance that is equal to a width of a first address, if information relating to the designated address is read from said optical disk, and
determining whether access to the optical disk is possible at a predetermined reference position of said optical disk and whether information relating to the designated address is read and,
when access is possible at said reference position, then a controller changing the access destination to an address that is located away from the address that caused a failed access attempt, by a distance that is equal to a second address width, the second address width being longer than said first address width, and
when access is not possible at said reference position, the controller executing a predetermined internal error processing.

6. An optical disk device for retrying failed access attempts for accessing an optical disk, said optical disk device comprising:
a controller for judging whether or not an access failure is caused by a defect of said optical disk when a predetermined cause of access failure repeatedly occurs in a predetermined range of the tracks on said optical disk,
wherein said controller performs the functions of:
performing processing for retrying access attempts to said optical disk by an optical pickup unit when access failure occurs,
judging whether or not the access failure is caused by a defect of said optical disk, and
judging whether said predetermined cause of the access failure repeatedly occurs in a predetermined range of the tracks on said optical disk,
when said controller judges that access failure is caused by a defect of said optical disk when the optical pickup unit accesses a designated address on the optical disk, performs processing for changing an access destination to an address separated from the address that caused a failed access attempt, by a distance that is equal to a width of a first address, if information relating to the address is read from said optical disk by a read processor, and
determining whether access to the optical disk by the optical pickup unit is possible at a predetermined reference position of said optical disk and whether information relating to the address is read by the read processor and,
when access to the optical disk by the optical pickup unit is possible at said reference position, then the controller changes the access destination to an address separated from the address that caused a failed access attempt, by a distance equal to a second address width, the second address width being longer than said first address width, and
when access to the optical disk by the optical pickup unit is not possible at said reference position, the controller executes a predetermined internal error processing.

7. The optical disk device as set forth in claim 6, wherein said optical disk device further comprises:
a vibration detector for detecting a vibration occurring in the optical disk, and
said controller judges whether or not the access failure is caused by a vibration when, in the retry of said access attempts, the access failure does not repeatedly occur in said predetermined range, and the vibration detected by said vibration detector exceeds a predetermined threshold value at a time of the access failure, and the controller judges whether or not the defect of said optical disk caused the access failure when said vibration does not exceed the predetermined threshold value.

8. The optical disk device as set forth in claim 7, wherein when it is judged that access failure is caused by the defect of said optical disk, access attempts are repeated over a first time or a first number of times and said controller ends the retry of said access attempts and executes a first error processing, while when it is judged that a vibration caused access failure, access attempts are repeated over a second time or a second number of times and said controller ends the retry of said access attempts and executes a second error processing.

9. The optical disk device as set forth in claim 7, wherein said optical disk device further comprises:
the optical pickup unit utilized in an optical system to emit a beam at said optical disk and output a light of the beam;
an optical pickup drive for moving the position of the emitted beam of said optical pickup unit with respect to an information track of said optical disk and a focal position of said optical system; and
a servo controller for controlling said optical pickup drive in accordance with an output signal of said optical pickup unit so that the beam is emitted at a designated position on said information track in a state of focus of said optical system, and
said controller judges in the retry of said access attempts that the access failure is caused by the defect of said optical disk when poor servo control of said servo controller repeatedly occurs in the predetermined range of the tracks on said optical disk.

10. The optical disk device as set forth in claim 7, wherein said optical disk device further comprises:
the optical pickup unit for utilizing an optical system to emit a beam at said optical disk and output a light of the beam; and
the read processor for reproducing a clock signal based on an output signal of said optical pickup unit, wherein said controller judges in the retry of said access attempts that the access failure is caused by the defect of said optical disk in the predetermined range of the tracks on said optical disk.

11. The optical disk device as set forth in claim 7, wherein said optical disk device further comprises:
   the optical pickup unit for utilizing an optical system to emit a beam at said optical disk and output a light of the beam; and
   the read processor for reproducing address information on said optical disk based on an output signal of said optical pickup unit,
   wherein said controller judges in the retry of said access attempts that the access failure is caused by the defect of said optical disk in the predetermined range of the tracks on said optical disk.

12. The optical disk device as set forth in claim 7, wherein said optical disk device further comprises:
   a rotation controller for controlling a rotational speed of said optical disk at a designated speed,
   wherein said controller judges in the retry of said access attempts that control of the rotational speed has caused the access failure when a cause of access failure repeatedly occurs in said range of the tracks.

13. The optical disk device as set forth in claim 7, wherein said optical disk device further comprises:
   a skew detector for detecting a skew of a light receiving surface of said optical disk with respect to an emitted beam output from a laser diode of the optical pickup unit,
   wherein said controller judges in a retry of said access attempts that the access failure is caused by the vibration when a cause of access failure does not repeatedly occur in said range of the tracks and the skew detected by said skew detector exceeds a predetermined threshold value at a time of the access failure.

14. An optical disk device for accessing a designated address on an optical disk, said optical disk device comprising:
   a controller performing the functions of:
   when judging that access failure is caused by a defect of said optical disk when an optical pickup unit accesses a designated address on the optical disk, performing processing for changing an access destination to an address separated from the address that caused a failed access attempt, by a distance equal to a width of a first address, if information relating to the designated address is read by a read processor of the optical disk device from said optical disk, and
   determining whether access to the optical disk by the optical pickup unit is possible at a predetermined reference position of said optical disk, and if information relating to the designated address is read by the read processor and,
   when access to the optical disk by the optical pickup unit is possible at said reference position, the controller changes the access destination to an address separated from the address that caused a failed access attempt, by a distance that is equal to a second address width, the second address width being longer than said first address width, and
   when access to the optical disk by the optical pickup unit is not possible at said reference position, the controller executes a predetermined internal error processing.

15. The optical disk device as set forth in claim 14, wherein when information relating to the address is not read by the read processor, before determining said predetermined reference position, said controller searches for a readable address in a predetermined range of addresses from said address that was not accessed by the optical pickup unit and,
   when said range has a readable address, the controller changes the access destination to said address,
   when said range does not have a readable address, the controller determines said reference position.

16. The optical disk device as set forth in claim 14, wherein said controller performs processing for retrying failed access attempts by the optical pickup unit when judging in a retry of said access attempts by the optical pickup unit that the access failure is caused by a defect of said optical disk if a predetermined cause of access failure repeatedly occurs in the predetermined range of the tracks on said optical disk, and said controller executes access destination changing processing when the judgment is repeated over a predetermined time or a predetermined number of times.

17. The optical disk device as set forth in claim 16, said optical disk device further comprising:
   a vibration detector for detecting a vibration occurring in the optical disk,
   wherein said controller judges whether a vibration causes the access failure when, in the retry of said access attempts by the optical pickup unit the cause of the access failure does not repeatedly occur in said predetermined range of the tracks, and the vibration detected by said vibration detector exceeds a predetermined threshold value at a time of the access failure, and the controller judges whether a defect of said optical disk causes the access failure when said vibration does not exceed the predetermined threshold value.

* * * * *